United States Patent
Graziano

(10) Patent No.: US 11,544,736 B2
(45) Date of Patent: Jan. 3, 2023

(54) PAY AS YOU GO MARKETING CAMPAIGN

(71) Applicant: Postalytics, Inc., Rockland, MA (US)

(72) Inventor: Alexander Graziano, Scituate, MA (US)

(73) Assignee: Postalytics, Inc., Rockland, MA (US)

( * ) Notice: Subject to any disclaimer, the term of this patent is extended or adjusted under 35 U.S.C. 154(b) by 660 days.

(21) Appl. No.: 14/921,700

(22) Filed: Oct. 23, 2015

(65) Prior Publication Data

US 2016/0104191 A1    Apr. 14, 2016

Related U.S. Application Data

(63) Continuation-in-part of application No. 14/883,062, filed on Oct. 14, 2015, now Pat. No. 10,853,843.

(60) Provisional application No. 62/068,291, filed on Oct. 24, 2014, provisional application No. 62/063,758, filed on Oct. 14, 2014.

(51) Int. Cl.
*G06Q 30/02* (2012.01)

(52) U.S. Cl.
CPC ..... *G06Q 30/0246* (2013.01); *G06Q 30/0255* (2013.01); *G06Q 30/0277* (2013.01)

(58) Field of Classification Search
CPC ........... G06Q 30/0246; G06Q 30/0255; G06Q 30/0277
See application file for complete search history.

(56) References Cited

U.S. PATENT DOCUMENTS

| | | |
|---|---|---|
| 7,177,822 B2 | 2/2007 | Mahmood et al. |
| 7,624,173 B2 | 11/2009 | Bary et al. |
| 7,680,882 B2 | 3/2010 | Tiu, Jr. et al. |

(Continued)

FOREIGN PATENT DOCUMENTS

| | | | |
|---|---|---|---|
| EP | 2831753 B1 * | 10/2018 | ........... G06F 16/955 |
| WO | WO 2007/062026 A2 | 5/2007 | |

(Continued)

OTHER PUBLICATIONS

PURL Marketing—Not just for direct mail anymore, boingnet.com, Mar. 28, 2014, https://web.archive.org/web/20140328180502/https://www.boingnet.com/features/purl-marketing/ (Year: 2014).*

(Continued)

*Primary Examiner* — Kambiz Abdi
*Assistant Examiner* — Scott Snider
(74) *Attorney, Agent, or Firm* — Wolf, Greenfield & Sacks, P.C.

(57) ABSTRACT

A computer-implemented method for managing a campaign within a distributed computer network comprises acts of defining, in a memory of the distributed computer network, a personalized URL (pURL) associated with at least one user-specific advertisement; receiving trigger instructions that identify one or more conditions under which at least one second user-specific advertisement should be sent, wherein the second advertisement is associated with the pURL; sending the pURL associated with the at least one user-specific advertisement; tracking the pURL associated with the at least one user-specific advertisement for at least one trigger defined by the trigger instructions; receiving the trigger; and updating a campaign workflow responsive to the received trigger.

20 Claims, 21 Drawing Sheets

(56) References Cited

U.S. PATENT DOCUMENTS

| | | | |
|---|---|---|---|
| 8,200,761 B1 | 6/2012 | Tevanian | |
| 9,357,277 B1* | 5/2016 | Nijim | H04N 21/8586 |
| 10,853,843 B2 | 12/2020 | Graziano | |
| 10,880,261 B2 | 12/2020 | Graziano et al. | |
| 2003/0096625 A1 | 5/2003 | Lee et al. | |
| 2004/0085362 A1* | 5/2004 | Sauermann | G06F 16/2428 |
| | | | 715/777 |
| 2004/0117400 A1 | 6/2004 | Mccrystal et al. | |
| 2004/0225564 A1 | 11/2004 | Walsh | |
| 2006/0095422 A1* | 5/2006 | Kikuchi | G06F 16/957 |
| 2007/0011240 A1 | 1/2007 | Altberg et al. | |
| 2007/0094082 A1* | 4/2007 | Yruski | G06Q 30/02 |
| | | | 705/14.56 |
| 2007/0121846 A1 | 5/2007 | Altberg et al. | |
| 2007/0168256 A1* | 7/2007 | Horstmann | G06Q 30/02 |
| | | | 705/14.67 |
| 2008/0065730 A1 | 3/2008 | Wilson | |
| 2008/0086369 A1* | 4/2008 | Kiat | G06Q 30/0277 |
| | | | 705/14.67 |
| 2008/0147810 A1 | 6/2008 | Kumar et al. | |
| 2008/0195466 A1 | 8/2008 | Wright | |
| 2008/0195475 A1* | 8/2008 | Lambert | G06Q 30/02 |
| | | | 705/14.1 |
| 2008/0195665 A1* | 8/2008 | Mason | G06F 17/30887 |
| 2009/0063232 A1 | 3/2009 | Lissack et al. | |
| 2009/0249384 A1* | 10/2009 | Fang | G06Q 30/02 |
| | | | 725/23 |
| 2009/0271259 A1* | 10/2009 | Fish | G06Q 30/0245 |
| | | | 705/14.44 |
| 2009/0313116 A1 | 12/2009 | Ashbaugh | |
| 2010/0100545 A1 | 4/2010 | Jeavons | |
| 2010/0318407 A1* | 12/2010 | Left | G06Q 10/107 |
| | | | 705/14.1 |
| 2011/0010242 A1 | 1/2011 | Blaser et al. | |
| 2011/0055683 A1 | 3/2011 | Jiang | |
| 2011/0066689 A1 | 3/2011 | Olsson et al. | |
| 2011/0071906 A1 | 3/2011 | Kamiyama et al. | |
| 2011/0202379 A1* | 8/2011 | Srinivasan | G06Q 30/02 |
| | | | 705/7.13 |
| 2011/0313846 A1* | 12/2011 | Patwa | G06Q 30/0271 |
| | | | 705/14.43 |
| 2012/0036051 A1 | 2/2012 | Sachson | |
| 2012/0101938 A1 | 4/2012 | Kasower | |
| 2012/0179538 A1* | 7/2012 | Hines | G06Q 30/0242 |
| | | | 705/14.51 |
| 2012/0266219 A1 | 10/2012 | Coleman et al. | |
| 2012/0303467 A1* | 11/2012 | Farmer | G06Q 30/02 |
| | | | 705/14.72 |
| 2012/0324027 A1 | 12/2012 | Vaynblat et al. | |
| 2013/0073745 A1 | 3/2013 | Bilinski et al. | |
| 2013/0325671 A1* | 12/2013 | Glass | G06Q 30/0641 |
| | | | 705/27.1 |
| 2014/0143337 A1* | 5/2014 | McIntosh | H04L 67/02 |
| | | | 709/204 |
| 2014/0164613 A1* | 6/2014 | Mason | G06F 17/30887 |
| | | | 709/224 |
| 2015/0025981 A1* | 1/2015 | Zaretsky | G06F 16/9566 |
| | | | 707/740 |
| 2015/0180733 A1 | 6/2015 | Krutzler et al. | |
| 2015/0310481 A1* | 10/2015 | Brown | G06Q 30/0243 |
| | | | 705/14.42 |
| 2016/0104213 A1 | 4/2016 | Graziano | |
| 2019/0058687 A1 | 2/2019 | Graziano et al. | |

FOREIGN PATENT DOCUMENTS

| | | |
|---|---|---|
| WO | WO 2007/150055 A2 | 12/2007 |
| WO | WO 2016/065285 A1 | 4/2016 |

OTHER PUBLICATIONS

Mad Mimi, "Everything You Ever Wanted to Know about Drip Campaigns", Feb. 12, 2014 as archived on May 31, 2014, https://web.archive.org/web/20140531102643/http://help.madmimi.com/everything-drip-campaigns-auto-responders/ (Year: 2014).*

International Search Report and Written Opinion dated Jan. 11, 2016 in connection with International Application No. PCT/US2015/055563.

International Search Report and Written Opinion dated Jan. 12, 2016 in connection with International Application No. PCT/US2015/057157.

Boldt, When Do Personalized URLs Work in Direct Marketing Campaigns? Target Marketing. Apr. 13, 2011 (serial online), <http://www.targetmarketingmag.com/article/personalized-urls-purls-effective-direct-marketing-campaigns/all/ >entire document. Last accessed Sep. 6, 2016, 5 pages.

U.S. Appl. No. 15/951,122, filed Apr. 11, 2018, Graziano.

[No Author Listed], Bulk personalized URL shortening. IP.com. Oct. 27, 2013; 6 pages.

* cited by examiner

| Contact Lists | | | Total Contacts Used: 0385 | |
|---|---|---|---|---|
| Boingnet Field | Your Mailling List Field | Boingnet Field | Your Mailling List Field | |
| First Name | First Name ▼ | Last Name | Last Name ▼ | |
| Address1 | Address1 ▼ | Address2 | Address2 ▼ | |
| City | City ▼ | State | State ▼ | |
| Zip | ZipCode ▼ | Company | BusinessName ▼ | |
| Occupation | Title ▼ | Email | Email ▼ | |
| Mobile Phone | Cell ▼ | Twitter Handle | Twitter ▼ | |
| Linkedin Id | Linkedin ▼ | Facebook Id | Facebook ▼ | |
| Phone Number | LeadSource ▼ | | | |
| Variable Data 1 | DOB ▼ | | Rating ▼ | |
| Variable Data 3 | <Variable Data 3> ▼ | Variable Data 4 | <Variable Data 4> ▼ | |
| Variable Data 5 | <Variable Data 5> ▼ | Variable Data 6 | <Variable Data 6> ▼ | |
| Variable Data 7 | <Variable Data 7> ▼ | Variable Data 8 | <Variable Data 8> ▼ | |

1200

FIG. 12 boingnet

Home >> Campaigns >> Campaign >> Create Personalized Campaign

◆ Create Personalized Campaign

Confirm Details

Campaign Info

- Campaign Type: Personal URL (pURL)
- Start Date: 09/30/2014
- Contact List: Boingnet: Employees 2
- Microsite Name: Google PPG Personalized
- Email Notification on Opened: No
- Email Notification on completed: No Payment Info

- Credits to be used: 8 (8 credits example pURL addresses for this campaign)

Landing Page Preview http://FirstName_LastName.mycompany.com/talicampaign

[Back]  [Create landing pages for this campaign:]

1301 — Confirm Details
1302 — Campaign Info
1303 — Campaign Type
1304 — Start Date
1305 — Contact List
1306 — Microsite Name
1307 — Email Notification on Opened / completed
1308 — Payment Info
1309 — Credits to be used
1310 — Landing Page Preview
1311 — http://FirstName_LastName.mycompany.com/talicampaign

FIG. 13

PAY AS YOU GO MARKETING CAMPAIGN

CROSS-REFERENCE TO RELATED APPLICATION

This application claims the benefit of U.S. Provisional Application No. 62/068,291, titled "PAY AS YOU GO MARKETING CAMPAIGN," filed Oct. 24, 2014, which application is herein incorporated by reference in its entirety. This application is a continuation-in-part of U.S. application Ser. No. 14/883,062, titled "PAY AS YOU GO MARKETING CAMPAIGN," filed Oct. 14, 2015, which claims the benefit of U.S. Provisional Application No. 62/063,758, titled "PAY AS YOU GO MARKETING CAMPAIGN," filed Oct. 14, 2014, the contents of which applications are incorporated by reference herein in their entirety.

BACKGROUND

Technical Field

The present disclosure relates generally to the field of pay as you go (PAYG) advertising and marketing campaigns.

SUMMARY

PAYG marketing campaigns refer to advertising by paying for the number of emails, commercials, or messages that are sent, rather than paying a flat fee beforehand. This method of marketing helps marketers control their campaigns based on how advertisements are being received. For example, if a marketer pays for an ad campaign to run for a year and then realizes the advertised product has a defect, the advertisements for a year would already be paid for despite the product being defective. With PAYG marketing campaigns, advertisements can be selectively cancelled or enforced based on sales.

Traditional PAYG marketing campaigns do not allow personalized emails, web landing pages, direct mail, or SMS messages targeted to specific consumers in response to an event or a received action. Click rates would increase if advertising campaigns could function by adapting around each individual consumer based on received consumer information. Therefore, it is appreciated that there is a need for a way to create personalized drip nurturing campaigns using variable logic and variable data to increase the number of views and clicks received during a campaign while also minimizing advertising spending. According to one embodiment, a drip nurturing campaign uses conditional logic, time periods, and triggers (e.g., an opening of an email) to plan a campaign workflow for a specific user or group of users. Campaign workflows may include a schedule of pre-planned messages that are sent out to contacts. In a drip nurturing campaign, according to one embodiment, the workflows and the messages that are sent are edited based on user actions.

It may be useful and particularly advantageous to create a marketing campaign that uses a PAYG system in combination with personalized URLs (pURLs) in emails, landing pages, SMS phone numbers, and SMS text messages schedule to send according to a drip nurturing campaign to increase click rates. Aspects and examples of marketing campaigns are provided herein that use triggered drip marketing with pay as you go as well as monthly billing campaigns, with the potential to automatically generate personalized campaigns from a lead generation campaign.

According to one aspect, a computer implemented method for managing a campaign within a distributed computer network is provided. According to one embodiment, the method includes acts of defining, in a memory of the distributed computer network, a personalized URL (pURL) associated with at least one user-specific advertisement, receiving trigger instructions that identify one or more conditions under which at least one second user-specific advertisement should be sent, sending the pURL associated with the at least one user-specific advertisement, tracking the pURL associated with the at least one user-specific advertisement for at least one trigger defined by the trigger instructions, receiving the trigger, and updating a campaign workflow responsive to the received trigger.

According to one embodiment, the conditions include waiting a period of time. According to one embodiment, the conditions include one or more user-defined conditions that determine delivery of the at least one second user-specific advertisement. According to one embodiment, the act of sending the pURL includes an act of sending the pURL via at least one of a group comprising an email, an SMS text message, and a direct mail message. According to one embodiment, the act of defining the pURL includes an act of receiving user information targeting at least one user. According to one embodiment, the user information is one of a group comprising an email address, a phone number, demographic information, and behavioral information. According to one embodiment, the user information is received from one of a group comprising a form, a social media website, and an uploaded list.

According to one embodiment, the trigger is a user action. According to one embodiment, the user action is one of a click on a pURL, an opening of an email, an opening of a microsite, a filling out of a form, and an opening of an SMS text message. According to one embodiment, the method further includes an act of receiving one or more content elements, the one or more content elements including a template and one or more user-provided content elements. According to one embodiment, the method further includes an act of binding the template and the one or more user-provided content elements with the pURL to create a portion of content including the received one or more content elements.

According to one embodiment, the method further includes an act of dynamically allocating the one or more content elements before the act of binding. According to one embodiment, the method further includes an act of generating a shortened pURL. According to one embodiment, the method further includes an act of generating a QR code for the pURL. According to one embodiment, the method further includes acts of receiving plurality of advertising credits and deducting one or more of the plurality of advertising credits responsive to the act of sending the pURL.

According to one embodiment, the act of updating the campaign workflow includes acts of defining, in the memory of the distributed computer network, a message associated with the at least one second user-specific advertisement, receiving second trigger instructions, sending the message, tracking the message for at least one second trigger defined by the second trigger instructions, receiving the second trigger, and updating the campaign workflow responsive to the received second trigger.

According to one embodiment, the method further includes an act of generating a report indicating the updated campaign workflow and the received trigger. According to one embodiment, the generated report includes a number of times the pURL was selected.

According to one aspect, distributed computer system for managing a campaign is provided. The system includes at least one processor operatively connected to a memory, the at least one processor configured to manage a plurality of system components, wherein the system further includes a defining component configured to define a personalized URL (pURL) associated with at least one user-specific advertisement, a receiving component configured to receive trigger instructions that identify one or more conditions under which a at least one second user-specific advertisement should be sent, wherein the second advertisement is associated with the pURL, a sending component configured to send the pURL associated with the at least one user-specific advertisement via a communication channel, a tracking component configured to track the pURL associated with the at least one user-specific advertisement for at least one trigger defined by the trigger instructions, a receiving component configured to receive the trigger, and an updating component configured to update a campaign workflow responsive to the received trigger.

According to one embodiment, the conditions include waiting a period of time. According to one embodiment, the conditions include one or more user-defined conditions that determine delivery of second user-specific advertisement. According to one embodiment, the sending component configured to send the pURL is further configured to send the pURL via at least one of a group comprising an email, an SMS text message, and a direct mail message. According to one embodiment, the defining component configured to define the pURL is further configured to receive user information targeting at least one user.

According to one embodiment, the user information is one of a group comprising an email address, a phone number, demographic information, and behavioral information. According to one embodiment, the user information is taken from one of a group comprising a form, a social media web site, and an uploaded list. According to one embodiment, the trigger is a user action. According to one embodiment, the user action comprises one of a click on a pURL, an opening of an email, an opening of a microsite, a filling out of a form, and an opening of an SMS text message.

According to one embodiment, the receiving component is further configured to receive one or more content elements, the one or more content elements including a template and one or more user-provided content elements. According to one embodiment, the system further includes a binding component configured to bind the template and the one or more user-provided content elements with the pURL to create a portion of content including the received one or more content elements.

According to one embodiment, the system further includes an allocating component configured to allocate the one or more content elements before the binding of the template and the one or more user-provided elements with the pURL. According to one embodiment, the system further includes a generating component configured to generate a shortened pURL for the pURL. According to one embodiment, the system further includes a generating component configured to generate a QR code of the pURL.

According to one embodiment, the system further includes a component configured to receive a plurality of advertising credits and deduct one or more of the plurality of advertising credits responsive a sent pURL.

According to one embodiment, the system further includes components configured to define a message associated with the at least one second user-specific advertisement, receive second trigger instructions, send the message, track the message for at least one second trigger defined by the second trigger instructions, receive the second trigger and update the campaign workflow responsive to the received second trigger.

According to one embodiment, the system further includes a generating component configured to generate a report indicating the updated campaign workflow and the received trigger. According to one embodiment, the generated report includes a number of times the pURL was selected.

According to one aspect, a non-transitory computer readable medium having stored thereon sequences of instructions for managing a campaign is provided. The non-transitory computer readable medium includes instructions that will cause at least one processor to define a personalized URL (pURL) associated with at least one user-specific advertisement, receive trigger instructions that identify one or more conditions under which at least one second user-specific advertisement should be sent, send the pURL associated with the at least one user-specific advertisement, track the pURL associated with the at least one user-specific advertisement for at least one trigger defined by the trigger instructions, receive the trigger, and update a campaign workflow responsive to the received trigger.

According to one embodiment, the conditions include waiting a period of time. According to one embodiment, the conditions include one or more user-defined conditions that determine delivery of the at least one second user-specific advertisement. According to one embodiment, the instruction to send the pURL includes an instruction to send the pURL via at least one of a group comprising an email, an SMS text message, and a direct mail message.

According to one embodiment, the instruction to define the pURL is further includes an instruction to receive user information targeting at least one user. According to one embodiment, the user information is one of a group comprising an email address, a phone number, demographic information, and behavioral information. According to one embodiment, the user information is taken from one of a group comprising a form, a social media website, and an uploaded list.

According to one embodiment, the trigger is a user action. According to one embodiment, the user action comprises one of a click on a pURL, an opening of an email, an opening of a microsite, a filling out of a form, and an opening of an SMS text message. According to one embodiment, the non-transitory computer readable medium includes an instruction to receive one or more content elements, the one or more content elements including a template and one or more user-provided content elements.

According to one embodiment, the non-transitory computer readable medium includes an instruction to an instruction to bind the template and the one or more user-provided content elements with the pURL to create a portion of content including the received one or more content elements. According to one embodiment, the non-transitory computer readable medium includes an instruction to allocate the one or more content elements before the act of binding.

According to one embodiment, the non-transitory computer readable medium includes an instruction to generate a shortened pURL for the pURL. According to one embodiment, the non-transitory computer readable medium includes an instruction to generate a QR code of the pURL. According to one embodiment, receive a plurality of advertising credits and deduct one or more of the plurality of advertising credits responsive a sent pURL.

According to one embodiment, the non-transitory computer readable medium includes instructions to define a message associated with the at least one second user-specific advertisement, receive second trigger instructions, send the message, track the message for at least one second trigger defined by the second trigger instructions, receive the second trigger, and update the campaign workflow responsive to the received second trigger.

According to one embodiment, the non-transitory computer readable medium includes an instruction to generate a report indicating the updated campaign workflow and the received trigger. According to one embodiment, the generated report includes a number of times the pURL was selected.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 12 is an example user interface of data mapping;

FIG. 13 is an example user interface of a campaign confirmation page;

DETAILED DESCRIPTION

Figure 1:
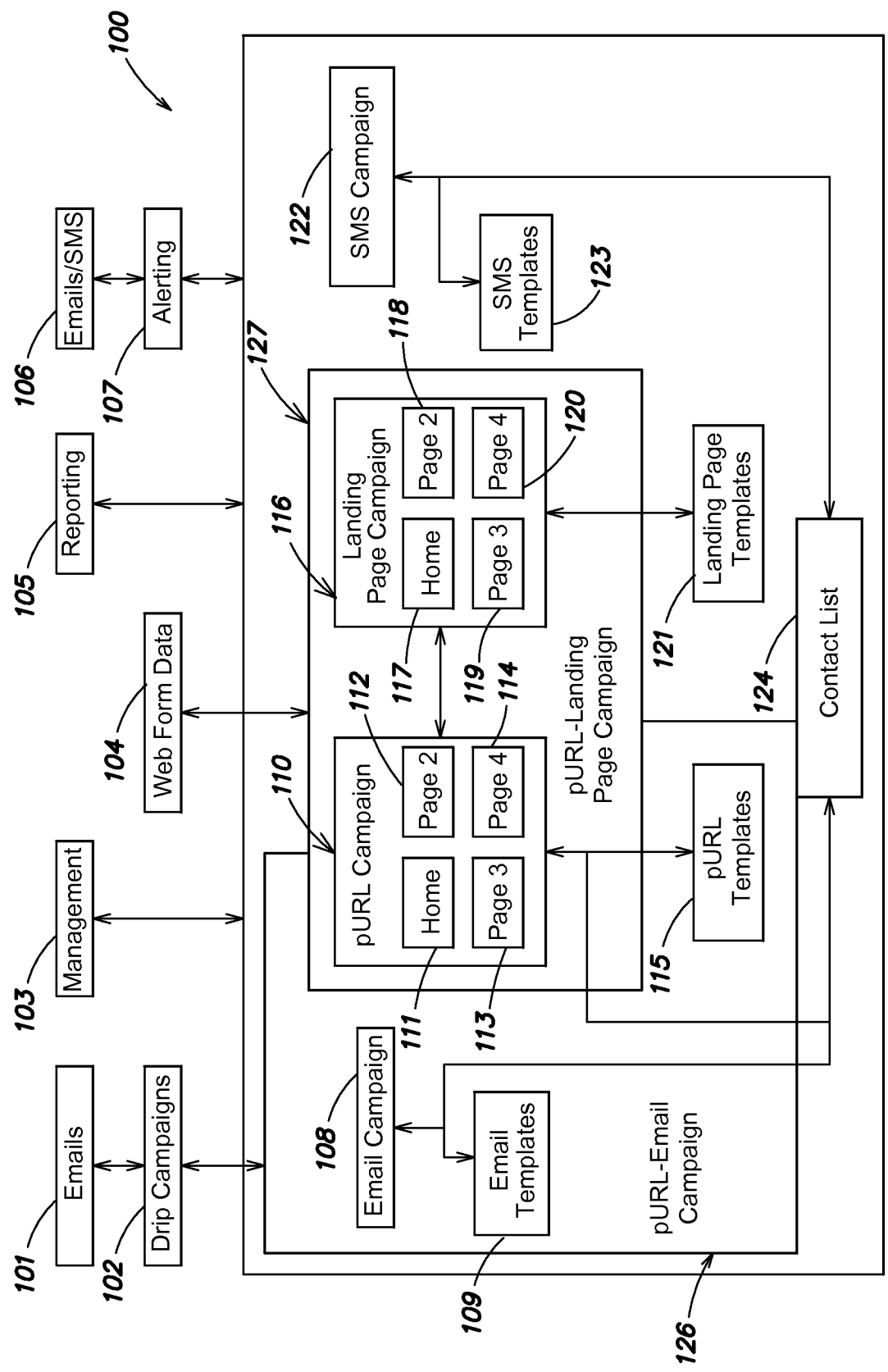
FIG. 1 is a block diagram of an example PAYG system environment, according to one embodiment.

Stated broadly, aspects and embodiments of the invention are directed to marketing operations. In one aspect, a marketing system can create a PAYG marketing campaign. Embodiments disclosed herein manifest the realization that methods and systems are needed to address some of the shortcomings of conventional PAYG marketing campaigns with regard to receiving higher click rates and being successful. In particular, there is a need for a way to personalize marketing campaigns to customize each campaign to target a user or group of users.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Various embodiments use user information to create a marketing campaign that sends messages through a plurality of channels, including email, short message service (SMS) text messages, and direct mail. Electronic campaigns, including email campaigns and text message campaigns, may use personalized URLs, or "friendly URLs," to increase the number of messages that result in a positive response. A positive response includes a received click on a pURL or an opening of an email or SMS text message sent within a marketing campaign. A "friendly URL" is a URL that is personalized and targeted at a specific user or a group of users, keyword, or keyword phrase. For example, "John- _Doe.boingnet.com/fallsales" may be a URL targeting a user named John Doe with a keyword phrase of fall sales.

A campaign may be sent to individual users or a group of users, the personalized URL may be generated automatically based on user information or manually by a received input. It may be appreciated that a certain "friendly URL" may be chosen to make it simpler for a human or a search bot to read, type into a browser, and understand the content of the underlying webpage. The "friendly URL" may also include keywords that make the page easier to appear on search engines. For example, if a pURL created is boingnet.com/Friendly_URL_Webinar, then a human on a search engine website such as, for example, Google or Yahoo, may see the pURL show up after typing in "Friendly URL." The URL may lead to a landing page that is based on a template.

The template may come from a template builder that includes multiple customizable parts of a landing page, including the header, body, footer, background, and fonts. The landing pages and emails can be created using HTML, CSS, Javascript, jQuery, Python, Ruby, PHP, and any other coding language, in combination with any type of database and other applications that may be used to generate content, including Adobe Flash and third-party widgets. A campaign may also be created via SMS text messages. In those campaigns, the computer may receive instructions to send personalized text messages to each user and include a landing page that is optimized for mobile devices via a "friendly URL." The "friendly URL" sent to a mobile device may be a shortened pURL that can be displayed easily on a small mobile device screen. The computer may also receive input to add a direct mail channel that includes sending mail to a user's address. The direct mail may also be personalized using the user information within the marketing campaign. In one embodiment, social networks may also be used as a communication channel within an advertising campaign.

In some embodiments, the marketing campaign may use a pay as you go (PAYG) method of payment which involves receiving electronic money via a credit card, Paypal, a third-party application, or any other method of receiving money electronically. The computer may exchange the credits for electronic money. The credits may be deducted from a user's account when a message within a marketing campaign is sent out. This way, it may be appreciated that the marketing campaign can be updated and directed based on how well the marketing campaign is doing. In some embodiments, credits in a PAYG plan associated with a user account may be set to last a certain amount of time before expiring (e.g., credits expire after a year of being purchased). In some embodiments, the marketing campaign is a monthly billing marketing campaign, in which a flat fee may be charged every month for a limited or unlimited number of campaigns and webpages. The monthly plans may be limited on number of landing pages, embeddable forms, page view, drip campaigns, email campaigns, personalized campaigns, personal URLs, QR codes, emails per month, text message per month, direct mail messages per month, receiving users, and others. In some embodiments, a marketing campaign may use a monthly plan with additional PAYG credits. If a plan does not include, for example, direct mail, then additional direct mail credits may be sent.

In some embodiments, notifications may be sent to a client based on clicks or opens on or within a pURL. Reports may be sent indicating how many times a specific pURL or a group of pURLs within a campaign have been opened. In some embodiments, each page within a campaign can be individually monitored. Further, in response to receiving information, such as information from a form, a thank you email based on an email template library may automatically be sent to a user. In other embodiments, in response to an action being performed within a page, the computer may redirect a user to a thank you page designed from a webpage template library. In some embodiments, an SMS text message may be sent to a user in response to received information from a page. The system can be configured to automatically send a thank you email responder or a thank you URL responder that can be automatically generated in response to a filled out form. The system can also, automatically or in response to a received control, redirect a user to another URL. The system can be further configured to collect statistics including parameters such as variable data within the redirected URL. Variable data can include unique tracking codes and sales representatives' identifications, learned or acquired information about the user such as birthday or last purchase date, among others. Variable logic can introduce unique content elements to certain viewers of a pURL, email, or SMS, based upon IF/THEN logic statements using variable data. For example, a donor for a non-profit organization that contributes over a threshold may see content welcoming them to the VIP donor group.

In some embodiments, conditions may be used to trigger drip campaigns. Conditions may include variable logic conditions, variable data conditions, and campaign conditions. Conditions may come from information in a filled out form indicating, for example, a consumer's birthday or a consumer's location. The information may be used to generate a drip campaign. Drip campaigns can further be targeted at specific consumers by using monitored actions by the specific consumers to update the campaign workflow. The system can use PAYG credits to send specific advertisements with pURLs to users based on whether or not, for example, they clicked a pURL or filled out a form.

FIG. 1 shows a block diagram of an example marketing campaign service and system suitable for incorporating various aspects of the present invention. For instance, a marketing campaign may include a contact list 124 to specify a user or a group of targeted users. The marketing campaign may consist of any combination of an email campaign 108, a pURL campaign 110, a landing page campaign 116, and an SMS campaign 110. Each campaign includes templates (e.g., email templates 109, pURL templates 115, landing page templates 121, and SMS templates 123) within a template builder than may be displayed within a point-and-click interface. Each template can be customized with text, images, videos, links, sounds, forms and any other design elements. A group of premade creative elements may be displayed and used within a webpage and additional elements may be accepted to be included in the webpage. Each campaign may use a template with a plurality of design elements as well as a pURL and metadata defining the campaign.

The template, creative elements, pURL, and metadata may all be bound together at instantiation of the page, text message, or email. The email campaign includes email templates and can include a pURL chosen for each user. The email campaign can be tracked by how many times an email is opened and how many times the pURL within the email is selected or opened. Sections of the email, landing page, and pURL may be automatically filled in with sections of user information. The pURL may have subpages that are each individually tracked. Each pURL is stored within a database along with the information of which users selected or opened the pURL and which forms were filled out within the webpage by which users. The pURL can be created in a variety of formats including a client's company website or Boingnet's URL such as, for example, JohnDoe.companyname.com, John.companyname.com/springcampaign, companyname.com/JohnDoe, and boingnet.com/JohnDeals. The generated pURLs can also last for a certain period of time, for example, for two months while a campaign is ongoing or until the next pURL is created.

In some embodiments, personalized URLs can be placed into a separate test mode can receive updated information in the middle of a campaign. The updated campaign may be tracked, and the tracking information may include the page URL, the page name, the status of each page, the date each page was created, the date each page was last updated, the date each page was accessed by a user, and the times associated with each date, among other information. Information regarding filled out forms, clicked links, and opened emails or messages may also be tracked. In some embodiments, a group of emails or phone numbers may be verified prior to the sending of a campaign. This method of list cleaning can be used to avoid wasting credits on users that have incorrect or out of date information (e.g., incorrect contact information). A list may be cleaned by checking emails for syntax errors, common mistypes, disposable emails, and valid domains.

A more thorough email verification may be done by attempting to send a sample message to each email to check if each email address exists within a domain. For instance, if an email is bounced and cannot be sent, then the receiving email address is indicated as invalid and is marked to inform the client. In some embodiments, an Edit Lists page is provided that displays which contacts on a contact list are invalid and may receive inputs to search through a list, edit a list, add users to a list, or delete contacts from a list. In one embodiment, the Edit Lists page may also include a control to clean the email addresses to check if any of the email addresses are invalid. Each pURL campaign may include a plurality of pages, including a homepage 117 as well as pages that the homepage may link to. Each landing page may also include a plurality of pages. In one implementation, the pURL pages and landing pages are all completely customizable. In addition to images, videos, links, and text, each page may also communicate with third-party applications. For example a Google Maps widget may be used to display a specific location, or a Facebook widget may be used to share a link to a page within a campaign with a social network.

The marketing campaign may also be associated with drip campaigns 102, wherein a set of scheduled actions may occur based upon behavioral segmentation and profile driven segmentation of a campaign as of the date and time of the set of scheduled actions. For example, if a drip campaign begins in the beginning of a month (e.g., September), the drip campaign may be set to send another email in the middle of the month if the first set of emails were successful. The campaign may be alternatively set to send an email or text message every four weeks until a message is successfully received.

In one embodiment, the drip campaign method of marketing allows automatic management of a campaign without a need to receive further instructions within a campaign. The management module 103 may manage all of the elements of the campaign and update them according to user information. In another implementation, drip campaigns 102 also allow a contact list to be segmented based upon the interactions between the members of the list and the dynamically generated campaign elements to create subsequent automated actions within the campaign. For example, if half of the users in a contact list select an email advertising indicating an upcoming sale, the campaign drip may be set to send that half of the users a second email advertising specific promotions within the sale and the other half of the users may receive a more generic sales advertisement. Further, drip campaigns may take user inputs and adapt messages based on those inputs. For example a user may choose to hear more about advertisements relating to sales on men's clothing, and then periodically receive more emails for men's clothing. The contact list may be further segmented in response to a certain number of emails not being selected. For example, if eight emails were sent out and all ignored, the receiving user may be moved into a list of users that are indicated to receive fewer messages. In one embodiment, a step or series of steps may be performed on a list of users that have not yet engaged with the campaign, or have met or failed to meet other conditions. For example, if a user has not clicked on any of the first three messages in a drip campaign 102, the campaign may be "restarted" for the user, with the first message being re-sent, followed by the second, etc., in an attempt to engage the user. In another example, a user that has engaged with many early message in a drip campaign 102 may be provided with more frequent messages, or may be omitted from additional early messages in favor of receiving messages scheduled for later in the campaign.

In some embodiments, additional timing constraints may be placed on a drip campaign 102. For example, a cutoff date may be provided such that no further messages may be sent after a particular date, no matter how far into the campaign a particular user is. It may be necessary to automatically terminate a drip campaign 102 after the event that is the focus of the campaign has passed. For example, a drip campaign 102 for a "Black Friday" promotion may be set to terminate on Black Friday, even for users that have not received all of the messages in the drip campaign. In some embodiments, the system may compress the drip campaign 102 for users who begin the campaign late, or for users who have been re-started after not engaging with the beginning of the campaign. For example, a drip campaign 102 scheduled to last for 4 weeks may be fit into 10 days if necessary by compressing the amount of time between messages, to allow such "late" users to experience the whole drip campaign 102 by the cutoff date.

In some embodiments, it may be desirable for branding reasons for the messages sent in a campaign to come from an email address associated with a domain name recognizable to the recipient of the message. In one example, functionality is provided in the management module 103 for a user to register a domain name for use as part of advertising campaign. For example, a user administering a campaign to advertise products from ABC, Inc. may be provided the opportunity to register and configure the domain <ABCpromos.com> in the management module 103. Once the domain is purchased, the user may be provided the opportunity to configure it, and provision all backend resources, in the management module 103. For example, the user may be prompted to create email addresses on the domain from which messages will be sent. In some embodiments, configuration and provisioning may be handled automatically by the management module 103 or other component according to predetermined specifications.

The reporting module 105 may be associated with the marketing campaign and used to periodically send a client reports based on the tracking of a group of pURLs. The reports can include a timeline of how many clicks and opens occurred within a time range as well as what forms have been submitted and if any user referrals occurred. The reports may include information about any users added to a campaign via another user as well as tracking information for the added user, such as how many clicks were received from a user for a specific pURL. A report may be provided that shows information about which forms were completed within a webpage and can also export any information relating to the pURL into, for example, a comma separated value (.csv) file or any other file. The reports may also be exported into an email or other type document in any format.

In some embodiments, the alerting module 107 may alert a client when an action is performed such as a click of a pURL or an opening of an email for a specific user or group of users. The alerting module may be configured to send an email with user information when a new user is added to a campaign. The marketing campaign may further be configured to create web form data 104. The web form data 104 includes embed code that allows a pURL, landing page, or microsite to be put into other pages via a snippet of HTML code. The advertised portions of the landing page may be customized to show an image or contain text relating to the campaign. The embed code may allow pages of a microsite to be displayed in a web page that is not associated with the platform provider (e.g., Boingnet) in any way. Data regarding the usage of the template within the third-party website is tracked as well as data that is inputted from the third-party webpage onto the Boingnet template.

The embed code may be a uniquely created set of Javascript that is associated with the page template, the microsite, and the campaign within the platform provider (e.g., Boingnet). A microsite is an individual web page or a small cluster of pages that are meant to function as a discrete entity within an existing webpage or to complement an offline activity. Information regarding the microsite can be stored in a library and can be edited while live. According to one embodiment, each microsite can be used in more than one campaign simultaneously, as they are put into production during campaign generation. The web form data also includes a QR code that may be generated to lead to a landing page. A user may access a landing page or a pURL customized with a mobile interface via a QR code. Also, in another implementation, a unique QR code may be added for each page in a landing page campaign. Further, in some embodiments, a shortened pURL may be generated to make landing pages easier to share on social media such as Twitter, Facebook, Foursquare, Google+, LinkedIn, or any other social media network.

Figure 2:
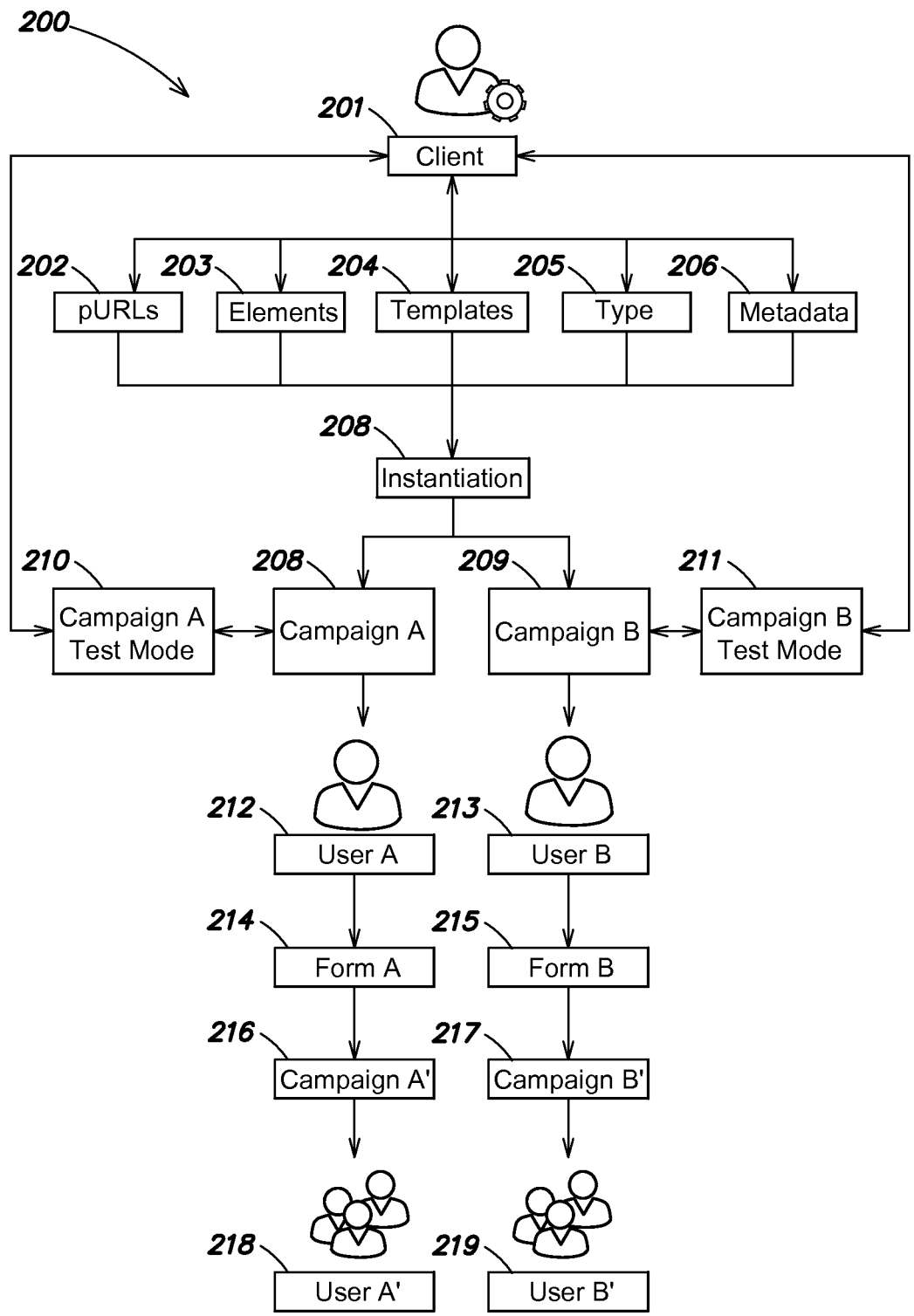
FIG. 2 is a block diagram of an example process for campaign creation and distribution, according to some embodiments.

FIG. 2 shows a block diagram showing an example of how a marketing campaign 200 is created and how it may be shared with users. The system may receive input from a client 201 for customization information relating to a campaign. A campaign includes of a type 205 (e.g., SMS text campaign, email campaign, pURL campaign, direct mail campaign, etc.), and a plurality of templates 204, elements 203, pURLs 202, and metadata 206 used for the pages, emails, or text messages sent in the campaign. Before and after instantiation 207, the campaign pages are created within a sandbox environment (e.g., campaign A test mode 210 and campaign B test mode 211) that can be edited and previewed without being deployed.

The creative elements 202-206 all come together before being instantiated and after being instantiated, the creative elements are used to compose pages within different campaigns. Campaign A 208, for example, is generated specifically for at least one User A 212 and Campaign B 209 may be generated for at least one User B 213. Each campaign may have its own pages with individual pURLs, elements, templates, and metadata. A campaign may have different types. For example, a campaign may be both an email campaign and a text message campaign. The campaign may sell complementing messages via multiple channels to increase click rates. Some pages may also, for example, have an option to send a deal to a mobile phone via a QR code or an SMS text message. One feature of a page that may be sent to a specific user is a "one time use" feature. This feature enables controls to be put into place to allow for only one view of a pURL and associated campaign elements. One advantage of the "one time use" feature is that some marketing campaign pages may include elements such as a roulette game that allows a user to win a prize. To avoid letting the user play the game multiple times, the "one time use" feature limits the number of times the user can access a page to one.

In some embodiments, metadata information may be used in combination with a "friendly URL" to make pages in a marketing campaign receive more views via search engines. Metadata information and "friendly URLs" may be used to control the method by which web browsers display content. The combination of metadata information and "friendly URLs" may also allow the system to track activity of a campaign using $3^{rd}$ party tools. Metadata information may include a page title, a site name, meta-descriptions, and custom meta-tags. All of the information may be customized by received inputs depending on what targeted searches the webpage should be shown from. For example, if the marketing campaign is for a new flavor of frozen yogurt, the computer may receive multiple tags and words relating to frozen yogurt within different pages of the campaign and within the metadata relating to the campaign. This way, if someone were to type in "frozen yogurt" into a search engine, the landing page may show up early enough to be displayed to the user. In some embodiments, the campaign may be able to add various keywords to the meta-tags based on previously entered keywords and keywords within the HTML text, pictures, videos, and links.

Each campaign can also be put into test mode (e.g., campaign A test mode 210 and campaign B test mode 211). A campaign test mode allows a landing page or an email within a campaign to be modified while they are live, with creative and technical elements such as pages, content, links, and others without affected the live page. In some embodiments, campaigns are paused and put into "test mode" where pages can be viewed and forms can be filled out without changing the actual tracking associated with the campaign. After edits are done, the updated pages may replace the current pages. In some embodiments, the old pages may be accessed and tracked while edits are being made.

In some embodiments, a template may include a "Tell a Friend" feature that allows the system to receive a form from a member of a personalized campaign about an anonymous person and subsequently create, store, and track a pURL associating that anonymous person with a personalized campaign. In some embodiments, the anonymous person may be added to the lead campaign. In one embodiment, the system is configured to deduct credits from a client based on the anonymous person being added to the campaign. In other embodiments, a user may import a portion of a contact list from a social media website to a campaign, and the system may be configured to create, store, and track pURLs associating each of the anonymous people with a personalized campaign. In these embodiments, the system may automatically receive user information from social media profiles for the pURL campaign. In some embodiments, the system may receive information via a form, such as form A 214 for campaign A 208 and form B 215 for campaign B 209, that may be located on a microsite or page within a campaign. The computer may use the received information from the form to create a new campaign for a new user and associate the new campaign with the campaign that the form was taken from. The information received from the form may include information such as a first name, last name, email, phone number, Twitter handle, Facebook Id, and other information about one or more anonymous people including variable data. The at least one anonymous people, such as Users A' 218 and Users B' 219, may be added to the lead generation campaign. A new group of landing pages, emails, text messages, and direct mail messages may be created for the new at least one user.

Figure 3:
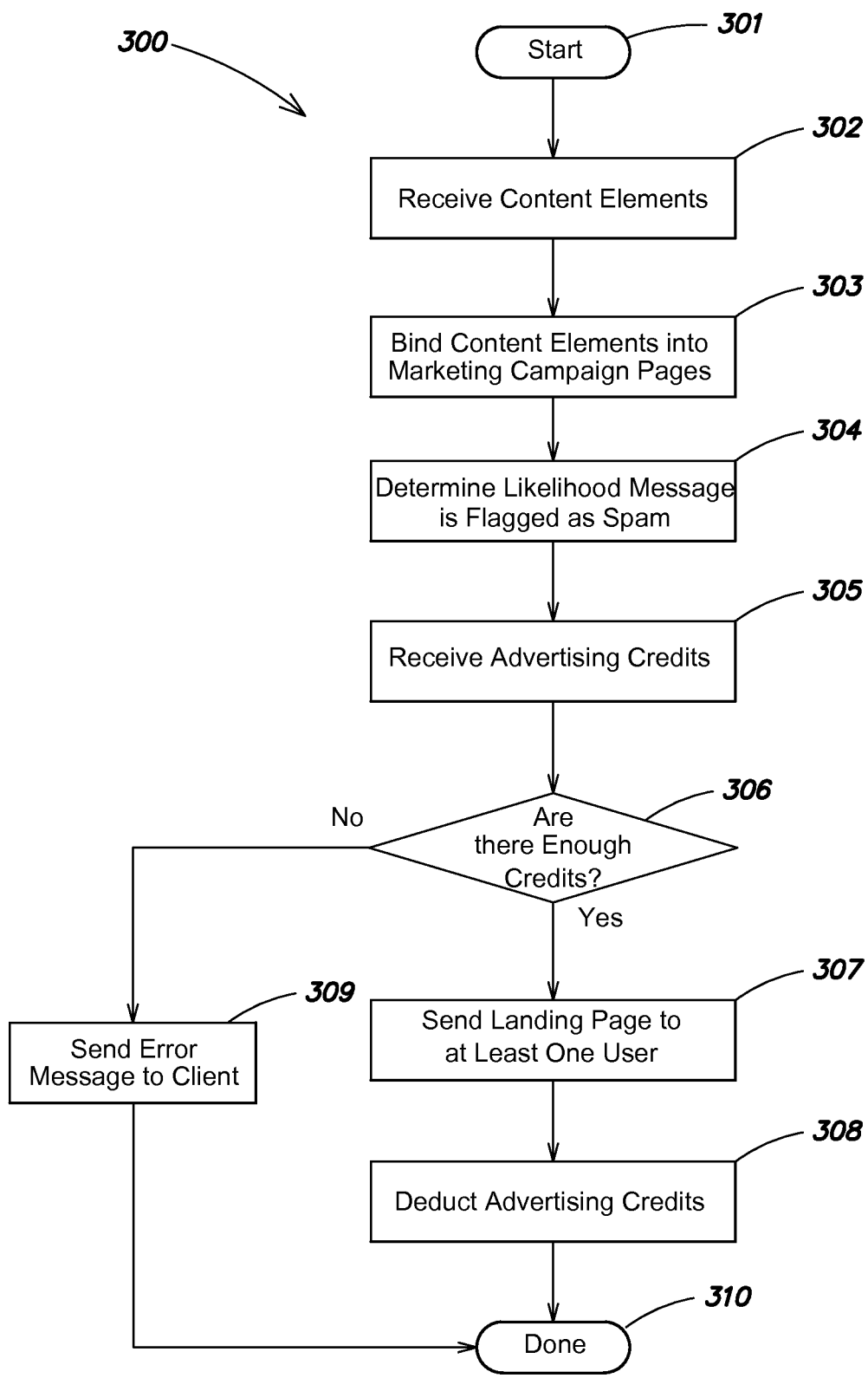
FIG. 3 is a flow diagram illustrating an example process for receiving and deducting credits, according to one embodiment.

FIG. 3 shows a process 300 for creating landing pages within a marketing campaign according to one embodiment of the present invention. At block 301, process 300 begins. At block 302, the computer receives content elements that define creative elements such as templates for each page within a marketing campaign, images, videos, links, pURLs, QR codes, and third-party widgets. An editing page is displayed that takes inputs via a point-and-click interface to create the layout of each page as well as which pages link to each other. Metadata is also received for each page as well as user information defining email addresses and phone numbers to send messages to in a campaign. The number of messages to be sent and how often to send a new message are received as well. Once all of the information and assets for all of the initial channels of the marketing campaign are received, at block 303, the computer may bind the content into marketing campaign pages, emails, and SMS text messages. Each bound page within the marketing campaign has a unique pURL. Each bound SMS text message may have an individual message to each specific user based on user information. Each generated direct mail message may also have a unique message with unique user information included.

At block 304, the generated email message may be automatically examined by the system to determine if the message is likely to be flagged as spam. Various pieces of data and metadata may be examined to make such a determination. For example, the text in the subject or body of the message is examined to determine how likely the syntax appearing there is likely to cause the message be flagged by a recipient's messaging system as spam. A database of words or phrases that may be cause an issue may be referred to. In some embodiments, the ratio of text to images in the message may be determined, with a relatively high ratio of images more likely to cause the message to be flagged as spam. In some embodiments, the email address to be used for sending messages in the campaign is analyzed to determine how likely the message is to be flagged as spam. In some cases, the use of large commercial re-mailers may be viewed by recipients of the message as indicia that the message is a spam.

The likelihood of the message being flagged as spam is report to the user. In some embodiments, a numerical "spam score" is calculated and communicated to the user. For example, a score may be provided on a scale of 0 to 10, with messages scoring close to 0 being the least likely to be flagged as spam, and messages with a score of 5 or higher likely to be flagged as spam. In some embodiments, the user is provided specific information as to why the message received the score it did, and may be provided with suggestions to reduce the score. For example, the user may be told that the number of images in the email is relatively high compared to the amount of text. As another example, the user may be told that removing the word "FREE!!," or that changing the punctuation or capitalization of the text, may improve the score. For messages receiving over a certain score, the user may be prompted to return to the message to make any edits as necessary. If the system determines that the email address used to send messages as part of the campaign is likely to cause the message to be flagged as spam, the user may be presented with the opportunity to register and configure a custom domain, as discussed above.

At block 305, the computer receives advertising credit to send the initial batch of messages. Advertising credits may be received via a pay as you go plan, a monthly plan, or a combination of a pay as you go plan and a monthly plan.

According to one embodiment, at block 306, the computer checks to see if the received advertising credits are enough to send the initial batch as well as the next batch of messages within the advertising campaign. At block 307, if the number of advertising credits is not enough, the computer may send a message via the Boingnet website that there are not enough credits for the campaign. Options may be displayed to reduce the number of channels or to add more credits. At block 308, if and when there are enough credits, the campaign may be delivered to one or more users via a plurality of channels, including email, direct mail, and SMS text messaging. At block 309, once the messages are all sent out, the computer may deduct advertising credits from a client's account. The credits required per email, SMS text message, pURL, landing page, and direct mail may be predefined. The computer may use the predefined rates and multiply the rates by how many of each type of message are being sent to calculate an overall deduction. At block 310, process 300 ends.

Figure 4:
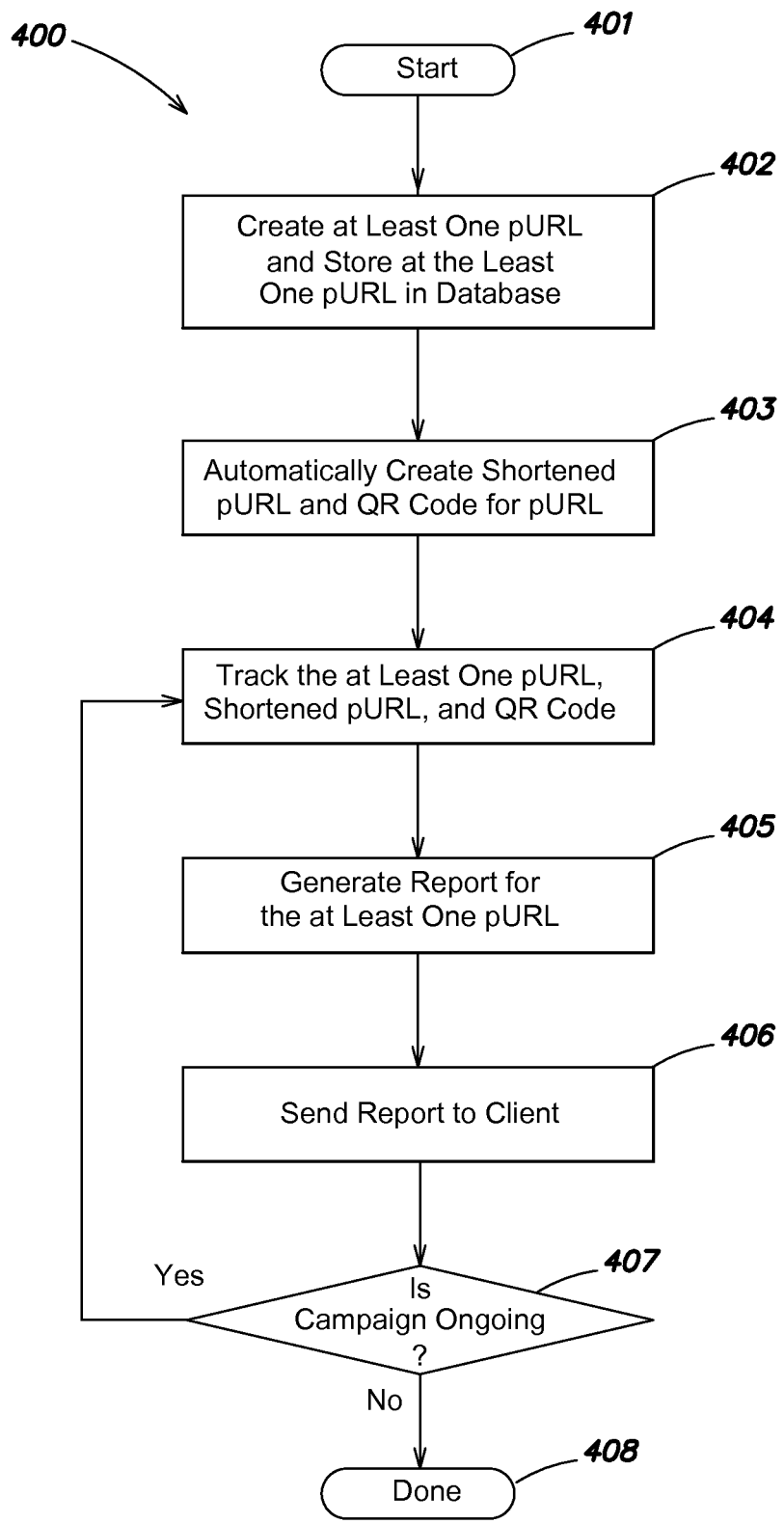
FIG. 4 is a flow diagram illustrating an example process for generating reports of pURLs.

FIG. 4 shows a process for generating reports for a pURL according to one embodiment of the present invention. At block 401, process 400 begins. At block 402, the computer creates at least one pURL relating to a marketing campaign and stores the pURL in a database. The created and stored pURLs may be a group of pURLs that may be linked together or relate to a similar campaign. The database that the URLs are stored in may be any type of database, including a SQL Server database, a MySQL database, a PostgreSQL database, or any other type of database. At block 403, the system may automatically create a shortened pURL to, for example, be used on social media websites and a QR code. The system may generate shortened friendly pURLs as well as the original pURL that may relate to the company's website or a generic domain name. At block 404, the created pURLs are sent to users within emails, direct mail, and SMS text messages and tracked for user interactions. The number of emails and SMS text messages sent out that include a pURL are tracked and opening of the emails and SMS text messages are also tracked. The computer may track clicks on a pURL within an opened webpage or text message. The computer may also track clicks via a third party website through embed code or a search engine. The tracking includes a timestamp for each activity. At block 405, after all of the pURLs are sent out and tracked for a certain amount of time, a report is generated for a user. The amount of time may be received during the creation of the campaign and may be a day, a week, a month, or any other period of time. The report is created with a plurality of charts indicating how many clicks of pURLs were tracked in comparison to how many pURLs were seen (the computer may assume that if an email was open, a pURL was seen), how many emails or SMS text messages were open in comparison to how many emails or SMS text messages were sent out, and how many pURLs were clicked in comparison to how many pURLs were sent out. The report may also include information about all of the pages linked to a main landing page and how many of them were visited. The report may also display how many requests to view a landing page from a third-party webpage were received. The computer may additionally segment the user list based on if a linked page within the main landing page was displayed to a group of users.

According to one embodiment, the report may be grouped with a plurality of other reports for other campaigns. The report may have an optional granularity level to display a report for each page or a report for the campaign as a whole. The report can also be segmented based on variable fields such as, for example, showing only users who have previously clicked on a pURL. The report may show the total number pURLs sent to unique people, how many of those pURLs were displayed to a user, and how many conversions occurred (e.g., how often a form on a page was filled out). The report may also display data according to any time period, as well as what the most active data for a campaign was. Further, the report can display information by day, month, year, or any other period of time. The report is not limited to pURLs; the report can also be reported according to emails, SMS text messages, and lead generation landing pages. The report can also display multiple segmented groups of users side-by-side for comparison purposes. It may be appreciated that a client can view how many users have clicked a pURL in one group in comparison to how many users have clicked a pURL in another group to adjust the target audience of a marketing campaign.

At block 406, the computer sends the report to the client. In some embodiments, the report is updated with new information so the new information can be displayed along with older information. In some embodiments, the report URL is the same as the old report URL, so an email or text message is sent to a client to notify that the report has been updated. In some embodiments, the computer may be configured to send text messages or emails in response to a click of a pURL or an opening of an email. At block 407, the length of the campaign is checked. If the campaign is ongoing, the computer may continue to track all of the associated emails, SMS text messages, landing pages, and pURLs. In some embodiments, if the campaign has ended, the computer may continue to track the pURLs if they are still running. In some embodiments, the landing page is removed from service and tracking along with it. At block 408, process 400 ends.

Figure 5:
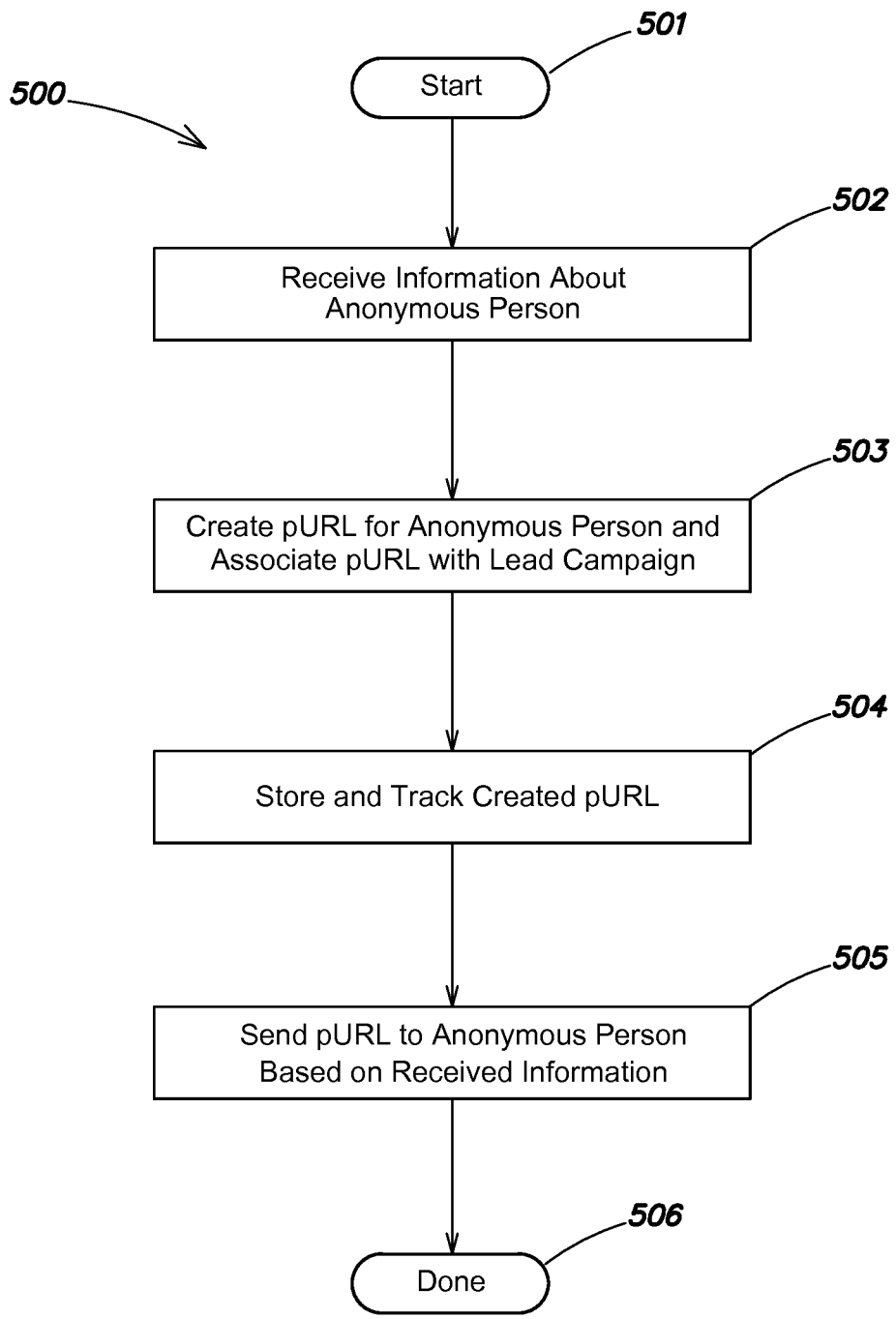
FIG. 5 is a flow diagram illustrating an example process for creating a pURL for an anonymous person from a lead campaign, according to one embodiment.

FIG. 5 shows a process for receiving a referral to link a marketing campaign with one or more additional users and tracking the linked marketing campaign according to one embodiment of the present invention. At block 501, process 500 begins. At block 502, the computer receives information about an anonymous person. The information may include a first name, a last name, an email address, a phone number, a home address, an occupation, a company, a Twitter Handle, a LinkedIn Id, a Facebook URL, or custom fields such as notes about the anonymous person. The information may be stored in a user database. At block 503 one or more pURLs are created for the anonymous person based on the received information. The pURLs, landing pages, emails, and SMS text messages are all customized for the targeted person using the information received in block 502. The created pURLs, emails, SMS text messages, direct mail messages, and landing pages are associated with the lead campaign to use all of the templates and elements of the lead campaign. The pURLs, emails, SMS text messages, direct mail messages, and landing pages may be based off of the lead campaign's emails, SMS text messages, and landing pages with more customized information according to the user information of the newly added user. At block 504, the created pURLs, landing pages, emails, and SMS text messages, along with their statuses (opened, not opened, clicked, not clicked) are stored in a database and tracked. The database may also include counters for each of the messages and pURLs so, for example, if a pURL is clicked multiple times one of the counters will increase to indicate those clicks. The pURLs, landing pages, emails, and SMS text messages may also have a field in the database to indicate a mapping to a new user added through a form on one of the pURLs, landing pages, emails, or SMS text messages.

According to some embodiments of the present invention, at block 505 the email, SMS text message, or direct mail message with at least one pURL to a landing page is sent to the newly added user based on the information provided in a form on a previous page. The messages and pURLs are tracked and the computer may be configured to notify a client of a pURL click or an email opening. New information added to a report is also created for the new user, which can be displayed within an aggregate of information for all of the users within a group or within the campaign as a whole. At block 506, process 500 ends.

Figure 6:
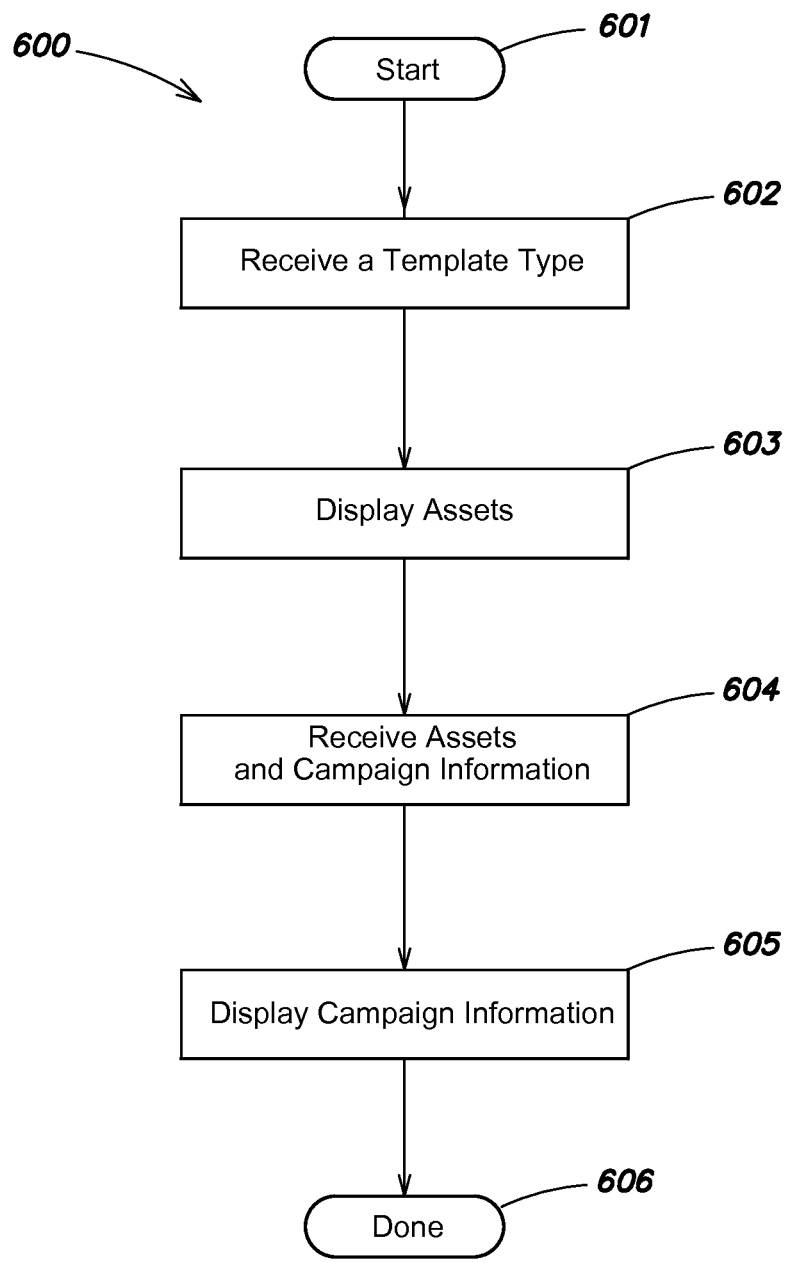
FIG. 6 is a flow diagram illustrating an example process for creating a template, according to one embodiment.

FIG. 6 shows a process for receiving information necessary to generate a campaign according to one embodiment of the present invention. At block 601, process 600 begins. At block 602, the computer receives a template type. The template type may be displayed to a client and received via a click. The template options may include a landing page template, an email template, an SMS template, a new page redirect template, an email template, or a redirect page template. In the case of an email template, the computer may receive information regarding the campaign name, an email subject, the email address that the email is sent from, the name of the client who is controlling the campaign, the mailing address, which is required to be in an email footer for legal compliance, as well as all of the information described below relating to the contents of the email, including the assets, variable data, and contact lists, and sending dates and times. Further, email templates may require a domain name for the sending email and a DNS record setting for sending the emails. The DNS records setting may be created using, for example, Sender Policy Framework (SPF) or DomainKeys Identified Mail (DKIM). DNS records for tracking emails may also be received.

Figure 8:
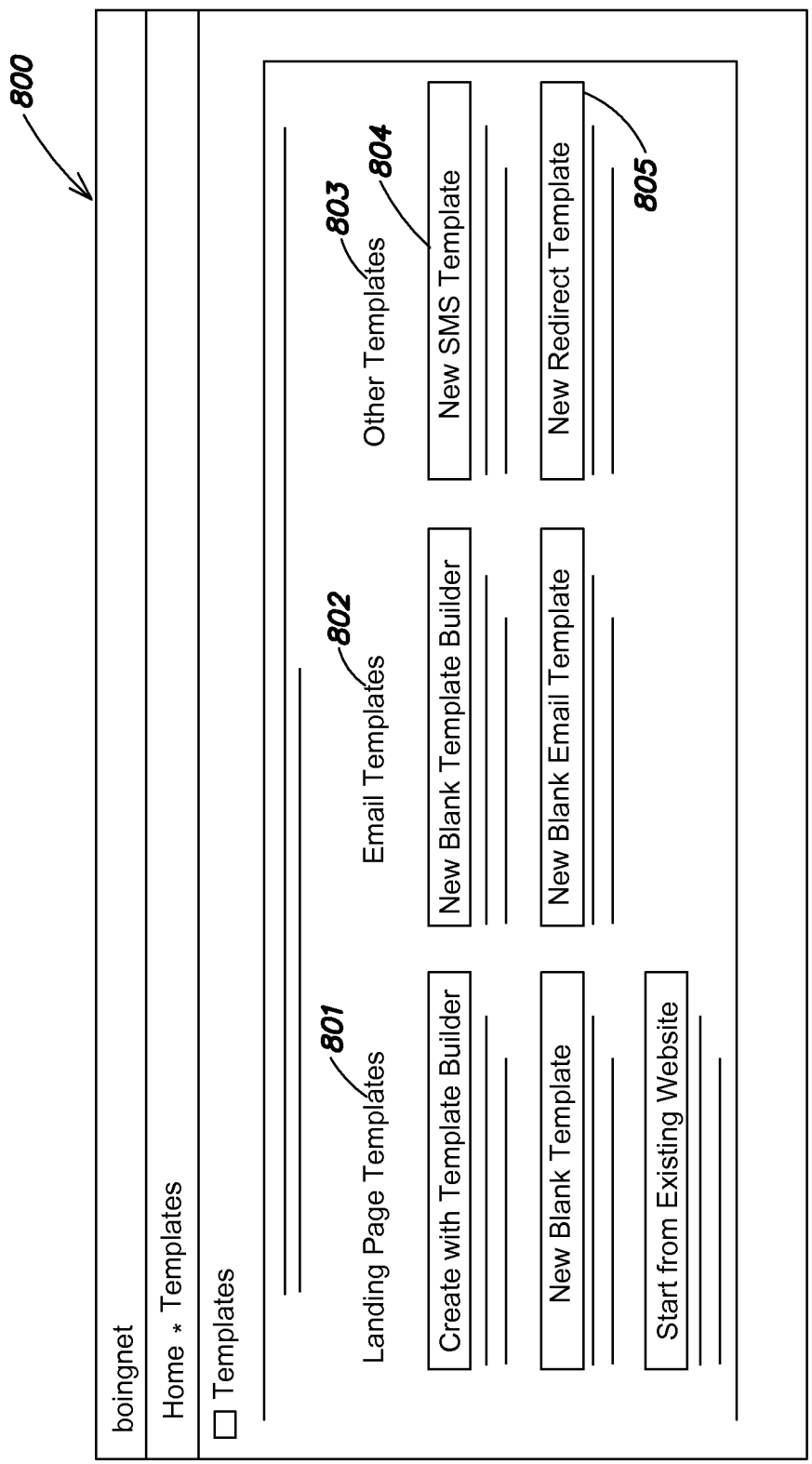
FIG. 8 is an example user interface of a template type choice display.

An example of one embodiment of a page 800 that may receive an input from a user to indicate a page type may be seen in FIG. 8. Multiple types of templates are displayed, each with a custom template builder depending on the type. According to one example, templates displayed include landing page templates 801, email templates 802, and other templates 803, which may include SMS templates 804 and redirect templates 805. The system may receive a redirect template to redirect a landing page to a "thank you" page or an external page. In some embodiments, a redirect page can be made with the intention of creating an ad in mind, and the redirect page would be an advertisement that redirects a user to the landing page from another webpage. Referring back to FIG. 6, at block 603, the computer may display various assets. Assets include page or email templates, images, videos, links, variable data, buttons, forms, variable logic, pURLs, meta information about the page, site names, email autoresponders, and other types of assets. Further, once created, a template may be copied over to one or more other campaigns and may be edited individually. Templates may also be stored in a database and quickly displayed on receipt of a search query relating to a template's name or metadata.

Figure 9:
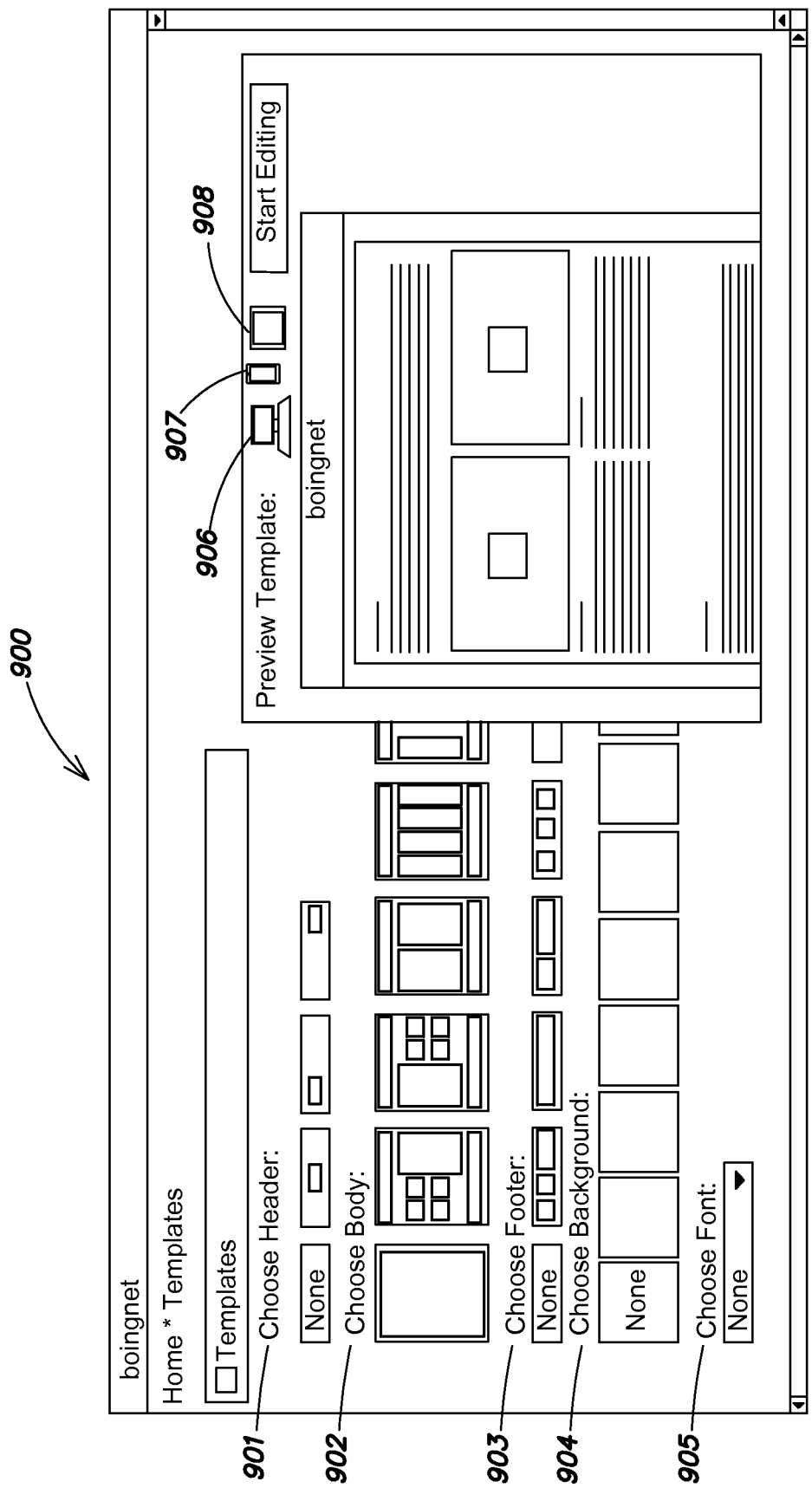
FIG. 9 is an example user interface of a template builder.

An example of one embodiment of webpage templates 900 that may be displayed are described in FIG. 9. Multiple options for a webpage including a header 901, body 902, footer 903, background 904, and font 905 may be chosen. Further, the page template may be displayed in a plurality of views including a desktop computer or laptop view 906, a mobile device view 907, and a tablet view 908. The system allows each view to be individually customized. In some embodiments, any two of the views can be automatically optimized based on the first view. The system may further be configured to display a preview template of the page being created, and the preview template may update and refresh depending on what options are chosen. In some embodiments, the system may receive inputs to cut and paste code. In some embodiments, the system may receive inputs to import from template libraries.

Figure 10:
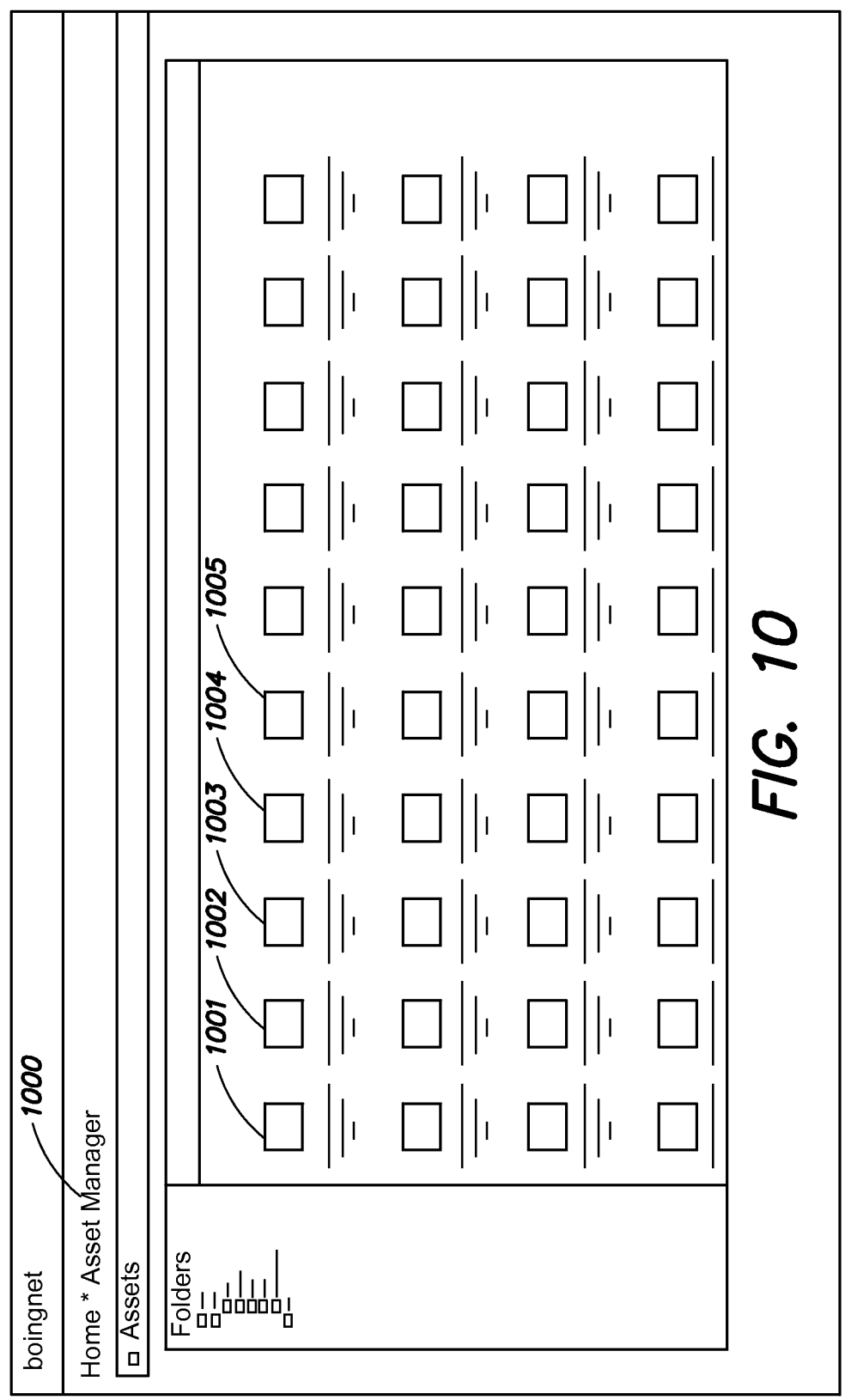
FIG. 10 is an example user interface of an asset manager.

The user interface for building a campaign may display anything that can be rendered in HTML, as seen, for example, in FIG. 10. FIG. 10 is a display of one embodiment of the asset manager 1000. Assets may include images that link to a third-party website such as Google+ 1001, Facebook 1002, Twitter 1003, Youtube 1004, LinkedIn 1005, and others, such as Google Maps. This feature allow marketing campaigns to easily work with other social networks to further increase click rates and be more successful. The assets may also include other buttons, fonts, image links, screenshots, and assets rendered via Adobe Flash. An advertising campaign may incorporate games or animations via Adobe Flash or any other program. Assets may be imported from a client's computer as well as from a received URL. The user interface may allow a received video file to be inserted into a page by automatically generating HTML code to embed the video into the page. Variable data and logic may use IF/THEN statements to display certain content to different users. For example, if a user's home address is near a location with a specific sale, then that sale may be included in the advertising campaign.

Figure 11:
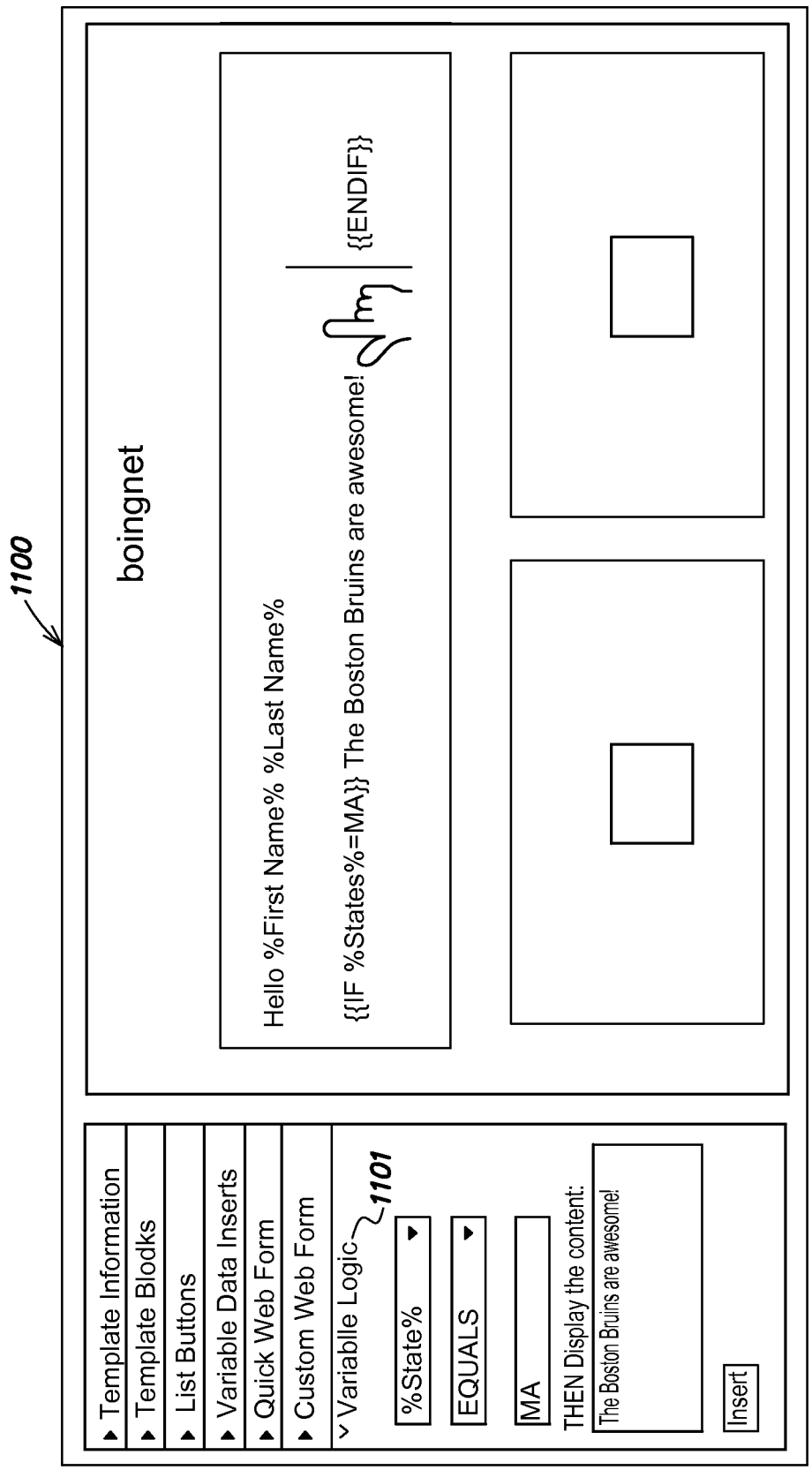
FIG. 11 is an example user interface of variable logic customization.

An example of one embodiment of a page 1100 that allows a user to use variable logic and variable data is shown in FIG. 11. The text on a landing page or email may be customized with user information using data taken from forms. The variable logic 1101 displays a user interface that can receive variable logic inputs in an easy fashion as to preview what the code would look like on the right. Any number of variable logic statements may be used within a webpage or email. An email or page may further include customized web forms, variable data, and linked buttons.

Continuing within block 604, microsite information including friendly URLs, page numbers, template names, page titles, page tags, site names, and meta descriptions may be received as well. A campaign name, URL domain, duration of a campaign, style of a landing page URL, and microsite to display with the campaign are also received. It may be appreciated that variable logic may be used to describe a URL style, as to include personal information within a "friendly URL." For example, if a user is located in Boston, a URL may be "boston.boingnet.com/John_Fall_2014_Deals" to further attract a user named John to click on the link. Metadata may be included defining a plurality of tags that make the campaign appear more often on search engines. The domain may be a generic Boingnet domain or a company's personal domain that can be used for the landing page. In some embodiments, a name checker would be included so that if two or more names on a contact list are the same, the pURLs may automatically be updated with a slight edit to make each pURL unique to each user. The update may include changing an underscore to a dash, removing an underscore or dash, or adding an additional number to the end of a pURL to make the pURL unique. In some embodiments, if two users are sent a message as part of the same campaign, the pURL in both messages may be the same. The duration for the campaign may define how long a campaign would go on, including how often messages within a drip advertising campaign should be sent. The campaign information may also include notification information on when and how often a client should be notified.

A control may be received to notify a client whenever a pURL is clicked or whenever an email is opened in relation to a specific microsite. A control may also be received to send reports at any time. Controls may also be received to add users to a campaign. Each user may have an associated first name, last name, email address, home address, phone number, and any other associated information such as interests and hobbies. In some embodiments, the user information may be updated within a form in a landing page or email. For example, the computer may receive a form indicating that a user enjoys "Electronics," so the landing pages and emails associated with that user may use variable logic to customize the page to include more information relating to electronics. A control may also be received to add a channel. Each channel or campaign added may optionally import a list of users from another channel within a campaign, another campaign, or an external file formatted with the list of users. Each channel or campaign may also export a list of users to a file. The file may be, for example, a CSV file, an XML file, or any other type of file. After a list of users is imported via a file, the fields from the file may show up on a dropdown menu to be mapped to Boingnet contact fields and variable data. For example, if a CSV file is imported with last name, first name, occupation, phone number, email, home address, city, state, zip code, Twitter ID, and Facebook ID, the information would have to be mapped within a user interface so Boingnet may associate those fields with variable data. An example of one embodiment of mapping users to fields in the present invention is shown in FIG. 12. As shown, each of fields displayed in user interface 1200 have associated dropdown menus that contain the information from the file with all of the users in it. In some embodiments, the computer may receive a control to map the contact fields and variable data for all of the users based on the first user in a file. This method assumes consistency in the CSV file as to the way the information is inputted. In some embodiments, an empty field of space between fields may indicate an unknown field. For example, if the Middle Name field is left blank In some embodiments, of the invention, then either the user has no Middle Name or the Middle Name is unknown. All of the users within a channel or campaign may be stored in a database associated with the channel, campaign, and client. All of the information may be customized while the campaign is active as well.

Information about users to be added to a campaign may be imported from other databases or websites on the Internet. In some embodiments, information is accessed from third-party websites used to track sales leads or other information about potential customers or others to whom outreach may be desirable. The user may be presented with a graphical interface for selecting a third party entity having the sales lead information the user wishes to add to a campaign. For example, the user may be given the option to import data from Salesforce, HubSpot, MailChimp, Microsoft Dynamics, or other third-party offerings. After the user has selected the database, a login screen may be presented so that the user can log in to the third party site using credentials previously established at the third party site. Once the user's credentials have been established, the option may be provided to download all contacts, selected contacts, or particular lists of contacts associated with the user's account. Those contacts may be downloaded for use in the present system. In some embodiments, fields in the third-party database may be automatically mapped to the system; for those fields that cannot be automatically mapped, the user may be presented with the option to manually map the field or, alternatively, to ignore it.

Once all of the campaign information is received, the computer stores the information in a database and calculates how many credits the campaign will cost.

At block 605, the campaign information that was received is displayed. The information may include any of the information received relating to the campaign. An example of campaign information that may be displayed is shown in FIG. 13, as a confirmation page. In this example, some of the campaign information 1301 that is displayed includes the campaign type 1302, campaign starting date 1303, the contact list that the campaign will be sent out to 1304, the name of the microsite used by the campaign 1305, whether or not a request to send emails to a client upon opening 1306, and whether or not a request to send emails upon completion 1307. The email notification on opened 1306 may include email notifications when an email or pURL is opened. The email notification on completed may include sending an email to a client whenever a form is completed within a campaign. The displayed information may further include payment information 1308. The payment information may include credit information 1309 regarding how many credits are to be used to create, for example, landing pages within a campaign. The displayed information may also display a landing page preview 1310, which may include a URL 1311 of a preview landing page. Further options may be displayed to receive a control to generate a QR code for a landing page, edit landing page URLs, edit a contact list associated with a campaign, or display a report associated with a landing page. The computer may also receive a control to send the files of a pURL with all associated landing pages to a user to be edited. Options may be further displayed to add or edit a drip campaign by adding times to send messages, deleting times to send messages, or changing groups of users who messages are sent to. For example, the computer may actively segment the contact list over the course of a campaign based on how the pURLs associated with the campaign are responded to. The contact list may be split by groups who have clicked on emails, groups who have clicked on pURLs within emails or SMS text messages, groups who have filled out a form, groups who have referred a friend via a received list, and others. Some embodiments include a control that allows a campaign to add channels throughout the course of the campaign. For example, an email, SMS text message, or direct mail channel may be added to a campaign that only consisted of one or two of the three channels beforehand. Further, in some embodiments, for example, a Twitter, Facebook, or LinkedIn feed may be added that may use variable logic and pURLs to advertise via various social networks. In some embodiments, multiple contact lists may be combined in a campaign. The combination of contact lists would include a duplicate checker to verify that each and every email address and phone number is unique and associated with a unique user. It may be appreciated that this duplicate checker makes for a simple way to reduce sending more messages than necessary. Referring back to FIG. 6, at block 606, process 600 ends.

Figure 7:
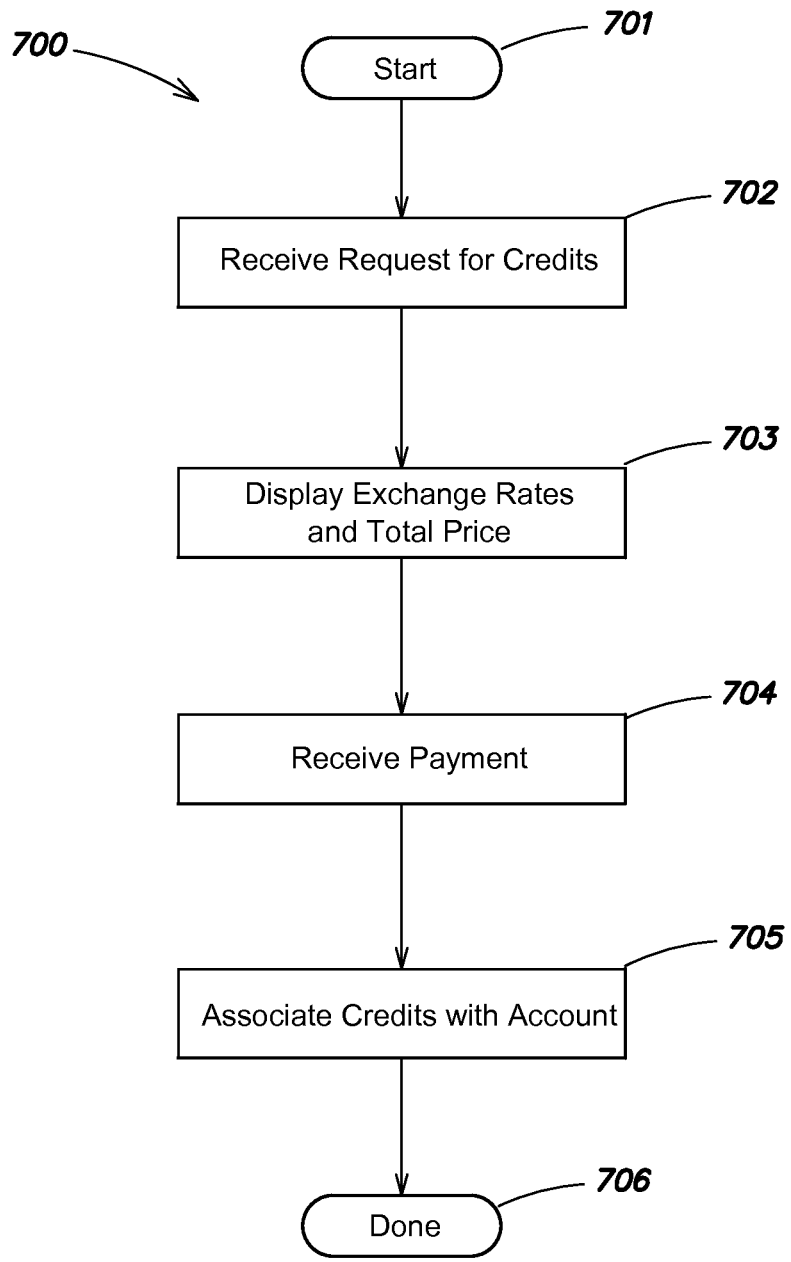
FIG. 7 is a flow diagram illustrating an example process for receiving a payment.

FIG. 7 shows a process for receiving payment and associating credits with a client's account according to one embodiment of the present invention. At act 701, process 700 begins. At act 702, the computer receives a request for a certain amount of credits. The credits may include, for example, pURL credits, email credits, landing page credits, SMS phone number credits, SMS text messaging credits, direct mail credits, or any other type of credit that may be used. Each credit may last for a specified period of time. Each type of credit may cost a different amount. For example, a pURL credit may cost more than an email credit. Once a request for credits is received, at act 703, the computer may calculate a price for the combination of all of the requested credits and display the exchange rates for each credit along with the total price of all of the credits requested.

Figure 14:
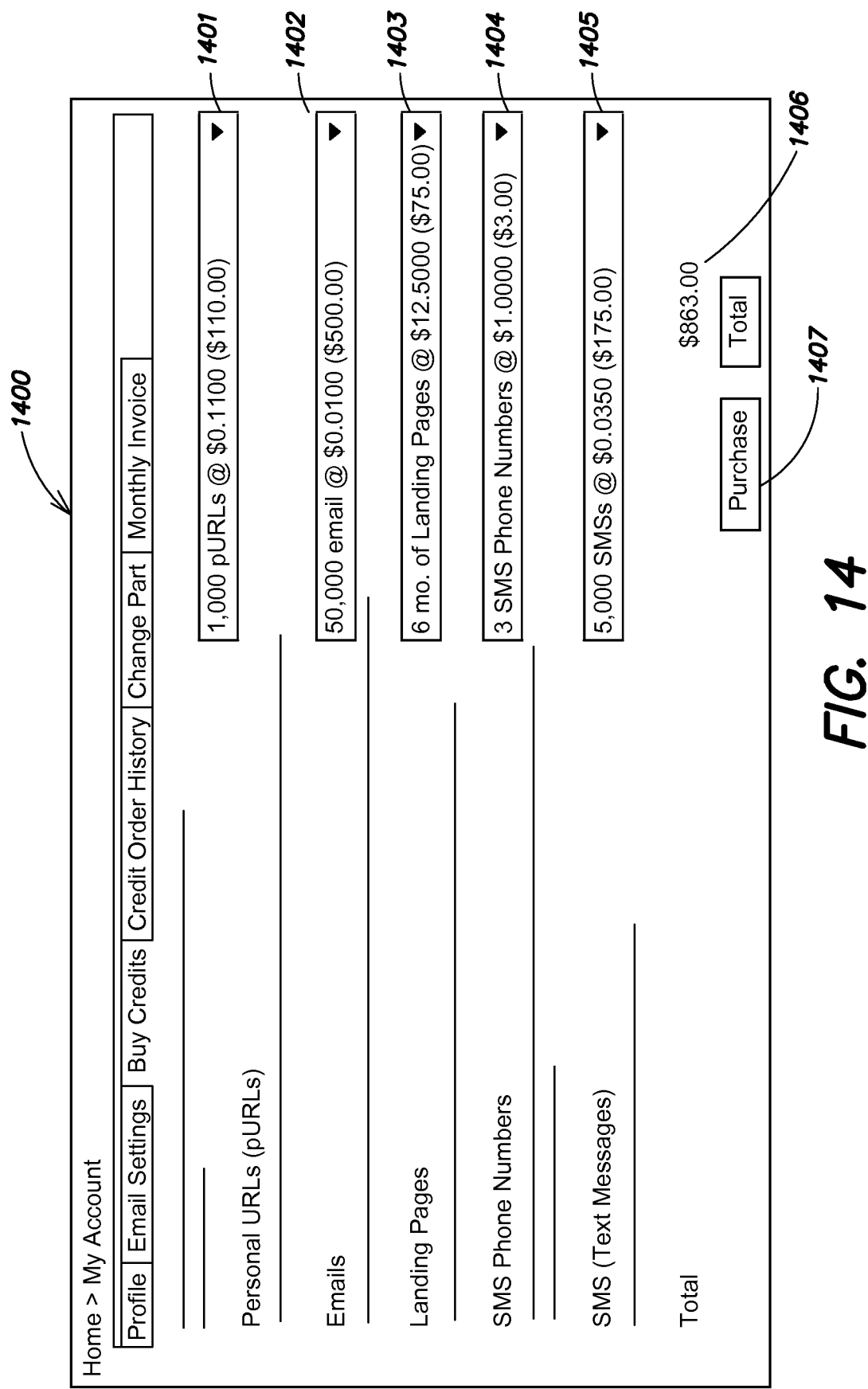
FIG. 14 is an example user interface of a credit purchasing page.

An example of one embodiment of a page 1400 showing the price of credits with their respective exchange rates is shown in FIG. 14. In this example, a request has been received including an order 1401 for 1000 pURLs, an order 1402 for 50,000 emails, an order 1403 for 6 months of landing pages, an order 1404 for 8 SMS phone numbers, and an order 1405 for 5000 SMS text messages. The exchange rates for each credit is displayed with the requested number of credits and the total price 1406 of the combination of all of the requested credits is displayed on the bottom of the page next to a purchase button 1407. At act 704, the computer receives payment for the credits. The computer may receive payment via a credit card, a debit card, a gift card, Paypal, a third-party application, or any other type of electronic payment method. In some embodiments, the user information relating to the payment may be securely stored for future purchases. Once payment have been received and verified, at act 705, the computer may associate the credits with the user account. This association may comprise linking an account with a number of credits. Further, PAYG credits may be requested from clients who are already associated with a number of PAYG credits or a monthly credit plan. In some embodiments, the newly bought PAYG credits are spent in a queue after the currently owned PAYG credits. The new credits expire later, so the old credits should be spend first. In cases where a user purchases credits while already associated with a monthly plan, if the monthly plan does not include unlimited credits for a type of credit, the computer may add the pay-as-you-go credits to a client's account on top of the monthly credits that are associated with the client. In some embodiments, the credits are used based on their expiration dates. For example, if a monthly credit expires on October $31^{st}$ but a PAYG credit expires on October $25^{th}$, the system may be configured to use the PAYG credit may be used before the monthly credit. In some embodiments, a control may be received for which credit should be used. Once the credits are associated with the user account, at act 706, process 700 ends.

Processes 300, 400, 500, 600 and 700 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein.

It will be appreciated that the present system and methods may be accessed in any number of ways. Access to the system may be provided through an API, whereby a third-party application may be allowed to access the system and its functionality through a number of interface functions exposed to the application. For example, the third-party application may be provided access to sendMail( ) or sendSMS( ) functions that trigger aspects of the functionality described herein by providing, as a parameter to the function call, a list of contacts to be contacted as part of a campaign. As a further example, the application may be given rights to access a createpURL( ) function, allowing the application to generate pURLs for a campaign.

In some embodiments, the system may allow for the creation of an agency account, which can be used by a user (e.g., an advertising agency) to control the campaigns of a number of clients. In some embodiments, the user may pay a recurring fee (e.g., monthly subscription) to maintain and operate an agency account. Individual client campaigns may be created, controlled, and carried out as discussed herein, with the added functionality of viewing, creating, and modifying individual campaigns for different clients and/or campaigns. For example, the user may be provided with a dashboard for viewing a list of clients and aggregate information about that client's current and/or historical campaigns. Such information may include total spend by the client, total number of impressions, total number of clicks, or other such metrics. It may also be possible, for example by clicking on a control, to expand all of the client's campaigns for a more granular view. For example, the spend on that campaign, the number of impressions made during that campaign, and the number of clicks gotten during the campaign may be presented.

In some embodiments, the user of such an agency account may be provided the opportunity to purchase a number of credits, as discussed above. Once the credits have been purchased by the agency, the system need not track how they are apportioned; the agency may apportion the credits to particular clients and/or campaigns according to need, business plan, or other factors. The agency may then bill clients as desired for the credits spent on the client's campaigns.

In some embodiments, the user of an agency account may be provided the ability to create sub-accounts that clients may access to view various metrics about ongoing, past, and future campaigns.

Example Computer System

Figure 15:
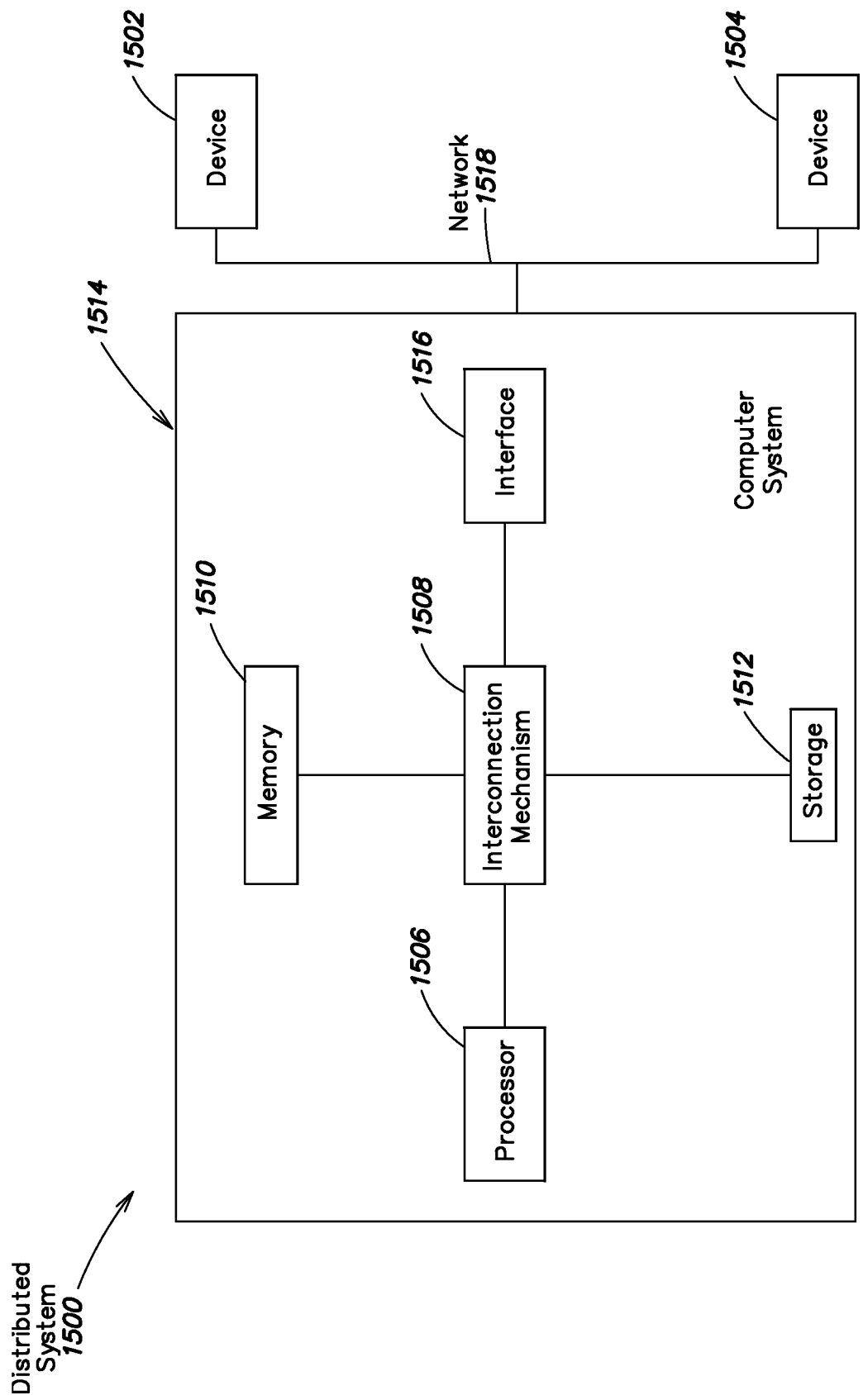
FIG. 15 is a block diagram of one example of a computer system.

FIG. 15 illustrates an example a block diagram of computing components forming a system 1500 which may be configured to implement one or more aspects disclosed herein. For example, the system 1500 may be communicatively coupled to one or more client systems and configured to perform marketing activities described above. The system 1500 may also be used to display information regarding the advertisements to a user.

The distributed system 1500 includes a computer system 1514. The computer system 1514 may include for example a general-purpose computing platform such as those based on Intel PENTIUM-type processor, Motorola PowerPC, Sun UltraSPARC, Texas Instruments-DSP, Hewlett-Packard PA-RISC processors, or any other type of processor. System 1500 may include specially-programmed, special-purpose hardware, for example, an application-specific integrated circuit (ASIC). Various aspects of the present disclosure may be implemented as specialized software executing on the system 1500 such as that shown in FIG. 15.

The system 1500 may include a processor/ASIC 1506 connected to one or more memory devices 1510, such as a disk drive, memory, flash memory or other device for storing data. Memory 1510 may be used for storing programs and data during operation of the system 1500. Components of the computer system 1500 may be coupled by an interconnection mechanism 1508, which may include one or more buses (e.g., between components that are integrated within a same machine) or a network (e.g., between components that reside on separate machines). The interconnection mechanism 1508 enables communications (e.g., data, instructions) to be exchanged between components of the system 1500.

The system 1500 also includes one or more input devices 1504, which may include for example, a keyboard or a touch screen. An input device may be used for example to configure the measurement system or to provide input parameters. The system 1500 includes one or more output devices 1502, which may include for example a display. In addition, the computer system 1500 may contain one or more interfaces 1516 that may connect the computer system 1500 to a communication network 1518, in addition or as an alternative to the interconnection mechanism 1508.

The system 1500 may include a storage system 1512, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor 1506 may cause data to be read from the nonvolatile medium into another memory 1510 that allows for faster access to the information by the processor/ASIC 1506 than does the medium. This memory 1510 may be a volatile, random access memory such as a dynamic random access memory (DRAM) or static memory (SRAM). It may be located in storage system 1512 or in memory system 1510. The processor 1506 may manipulate the data within the integrated circuit memory 1510 and then copy the data to the storage 1512 after processing is completed. A variety of mechanisms are known for managing data movement between storage 1512 and the integrated circuit memory element 1510, and the disclosure is not limited thereto. The disclosure is not limited to a particular memory system 1510 or a storage system 1512.

The system 1500 may include a general-purpose computer platform that is programmable using a high-level computer programming language. The distributed system 1500 may be also implemented using specially programmed, special purpose hardware, e.g. an ASIC. The system 1500 may include a processor 1506, which may be a commercially available processor such as the well-known Pentium class processor available from the Intel Corporation. Many other processors are available. The processor 1506 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Triggered Drip Nurturing Campaigns

Figure 16:
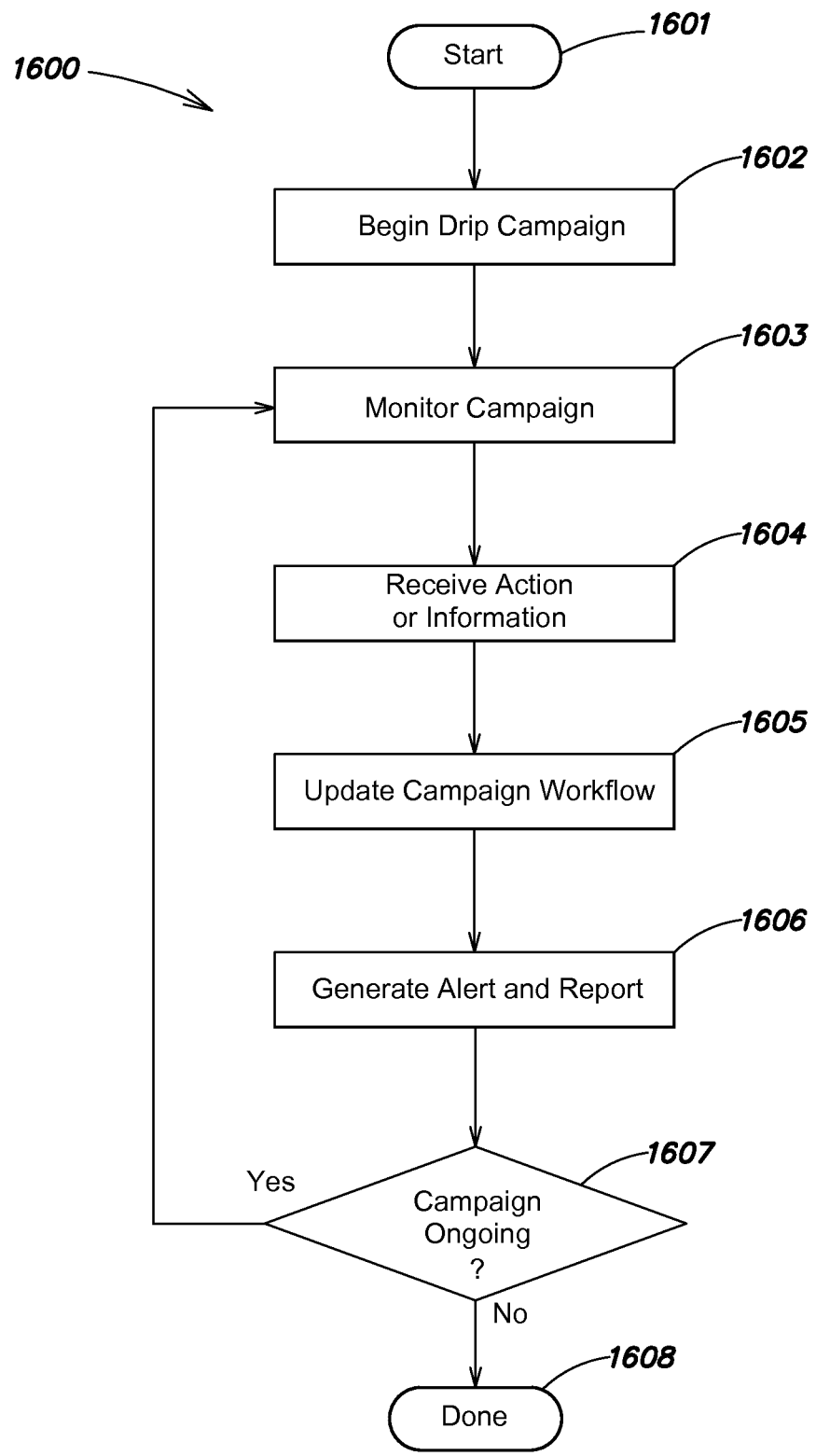
FIG. 16 is a flow diagram illustrating an example process for monitoring and updating a triggered drip nurturing campaign.

FIG. 16 shows a process for monitoring and updating a triggered drip nurturing campaign according to one embodiment of the present invention. At block 1601, process 1600 begins. At block 1602, the drip campaign begins and sends a first advertisement message via an email, an SMS message, or a direct mail letter, including a pURL or a landing page. In some embodiments, a QR code or shortened URL is sent within the first advertisement message. In some embodiments, the first message may be created or populated by information entered by a user interacting with an online or physical form.

In some embodiments, the data from the form includes, for example, an address associated with the user, and variable data including an interest of the user. In other embodiments, the first message may be sent out due to an event such as a holiday or birthday that the consumer is related to occurring. In some embodiments, the system may track user activity and send the first message as a result of an action by a user, such as, for example, a donation to a non-profit organization.

The system may monitor the action by the consumer and trigger a drip campaign with messages responsive to the action. In some embodiments, the drip campaign begins by the system immediately deducting an expected amount of credits for the whole campaign and notifying the client to confirm the deduction. In other embodiments, the system displays an amount of credits that the campaign is expected to use along with the current available credits, and includes a control to add enough credits and confirm that the system can automatically deduct credits on a rolling basis according to a triggered drip campaign.

At block 1603, the system monitors the campaign. In some embodiments, the system tracks the pURL and landing page sent out to the consumer, along with other pURLs and microsites sent to every consumer. As discussed, there may be multiple contacts (e.g., users and/or groups) associated with a campaign, and each contact may be assigned a unique pURL. In some examples, the system monitors multiple pURLs within a message. In one embodiment, the system tracks purchased items, purchase amounts, search histories, and other variable data.

The system may be configured to track when an email or pURL is opened in relation to the date the pURL or email was sent out. In one example, if the system does not receive a pURL click for three months after being sent, for example, the system may stop sending emails to the targeted user for a period of time. If the system then receives a pURL click for the pURL after four months, the system may add the user back to the campaign and start sending messages to the user again.

In some embodiments, the system may automatically send a message thanking the user for taking the time to view the email, along with some incentive or reward, such as a coupon. In some embodiments, if the pURL is clicked after a campaign has ended, the system may continue to track the pURL. In these embodiments, if the pURL is no longer active, the system may send an email with an apology for the inconvenience, as well as a coupon to thank the user for taking the time to visit the pURL as well and/or an email with information from a more recent campaign. In some embodiments, the system monitors a pURL being clicked outside of an email. For example, if a consumer posts a pURL on a social media website or messages a pURL to another consumer, the pURL may be monitored as being accessed from a different address. In some embodiments, the system may send emails to users for sharing a pURL with a certain number of other consumers. In one embodiment, a user can fill out controls such as, for example, checkboxes in a form indicating what types of advertisements they would like to see more of. One benefit of allowing a user to provide an input in advertisements is the user will be more inclined to click on messages when the user's input is incorporated in the messages. For example, the system may display a number of interests (e.g., sports, hiking, and running) that a user can check off and as a result that user may be put on advertisement lists correlated to each interest.

At block 1604, the system receives a trigger. A trigger can be an action or information that causes a reaction (e.g., a drip campaign or an updated campaign workflow). The information can be, for instance, updated user information. In some embodiments, the action relates to a part of the drip campaign or is an external action unrelated to the campaign. In some embodiments, an action may include a click of at least one of a message, a pURL, a landing page, or a microsite. In some embodiments, the system may be given access to a user's social media information and pull in data from a user's account. For example, the system can receive information relating to a user's interest in music and narrow the targeted drip campaign based on that information. The system can also receive other information, such as a user's friends list, to trigger a drip workflow with some messages similar to friends of the user. For example, if a user has five friends who are receiving and consistently opening emails and pURLs relating to comic books, the user may automatically be connected with an interest in comic books. In one embodiment, if the user is then sent an advertisement relating to comic books and does not indicate an interest in comic books by either clicking on the related message or pURL, the user may be removed from the comic book interest list. In one embodiment, each user has a list of associated tags stored in a database on the system that automatically updates based on received actions to further target advertisements to each of the users. In some embodiments, the system uses variable logic within a message or a pURL to display or hide content based on user interests. For example, an email may include logic describing that if a user enjoys ice cream, display a new flavor along with a coupon, but if a user does not like ice cream but rather enjoys protein bars, display a coupon for protein bars.

In one embodiment, the system also tracks previous pURLs and receives multiple preplanned email actions that are triggered when conditions occur. For example, a campaign may start by sending five similar advertisement messages to five different users with five different pURLs. According to some embodiments, the system may receive a click on a pURL in the email from the first user, a click on the email from the second user, a click on the pURL and pages inside the landing page from the third user, an opening of the pURL and a filled out form indicating a list of interests from the fourth user, and a click on the pURL and a form referring a friend to the campaign on a microsite within the landing page from the fifth user. According to some embodiments, the system may monitor and receive all of these actions, and create separate drip workflows for each of the users.

In some embodiments, each of the listed actions can be used with user information to further narrow the targeted consumer's drip campaign workflow. For example, if a consumer is listed as a fan of videogames and received two advertising message over a period of time, one relating to PC games and one relating to handheld games, the system can monitor both emails and generate the drip campaign workflow based on received actions in response to the messages. If, for example, the consumer clicked on the handheld games message and visited the pURL, but deleted the PC games message, the system can send less advertisements relating to PC games and more relating to handheld games. In some embodiments, advertisements and messages sent have associated tags that represent what the advertisement is relating to. In one embodiment, these tags can be stored to show which tags are of most interest to each consumer.

In some examples, two consumers may both be sent similar emails with a plurality of pURL-linked images within the email. If, for example, the system receives clicks on images relating to college supplies from one consumer and clicks on images relating to men's clothing from the other consumer, both consumer workflows may be updated and future messages for each consumer may be different based on the received clicks.

In some embodiments, each of the pURL microsites is individually tracked and the system receives triggers from each click of a microsite. Each page has metadata with tags associated with the information on the page. In one embodiment, the tags can be accumulated from each clicked microsite and the predominant tags may be used to lead the triggered drip campaign in what is advertised to that user. In some embodiments, variable logic used to display information in messages uses a tag percentage. A tag percentage can indicate a user's interest level in a certain topic. For example, if ten out of fifteen pURLs a user visits are related to "health", then the "health" tag will have a high interest level associated with a user. In some examples, variable logic can use IF/THEN statements to display content relating to "health" if the interest level of "health" is above 50%. In addition to receiving tags from clicked pURLs and social media information, tags can also be directly checked off in forms. In some embodiments, a user can create a profile to indicate some interests. In one embodiment, the interests checked off automatically have a 100% interest level. In other embodiments, the interests checked off may start at a high interest level and then adjust based on received actions from the user.

At block 1605, the system updates the workflow based on a trigger received from at least one user. In some embodiments, the workflow is a triggered drip campaign workflow that includes logical sets of preplanned messages, including emails, SMS text messages, and direct mail messages that are triggered when conditions exist or events occur. In one embodiment, when the workflow is updated, the payment information relating to the campaign is also updated to display the most up to date information to the client. In some embodiments, a whole workflow path may be generated based on user information at the beginning of a campaign. The workflow may then be automatically updated based on a received pURL visit or a completed form. The workflow may also be automatically updated based on a pURL not being visited. In some embodiments, the system may update the workflow by adding advertisement messages, including a new type of message (e.g., adding SMS text messages in response to receiving a phone number). The system may also update the workflow by changing the content of messages, updating messages with additional variable data and variable logic, and sending fewer messages to a user who does not seem interested in a campaign. In some embodiments, the system may receive information regarding an advertising credit cap. In those embodiments, the system may adjust the triggered drip nurturing campaign workflow to avoid costing more than the capped number of credits.

In some embodiments, the system updates the workflow for certain users based on a trigger received from at least one other user. In some embodiments, the system may determine that microsites relating to a particular topic may be of broader interest than the consumers associated with the current campaign. For example, the system may determine that a drip campaign to users interested in farm-to-table events is receiving a large number of clicks, and may expand the campaign to also target users interested in fine dining.

In some embodiments, the system can be manually edited to update the workflow. The system may automatically control the number of messages sent to each user, but the system may also receive input to manually change the drip campaign workflow according to a client. In some embodiments, the workflow may be updated based on a conversion rate and a delta conversion rate. For example, if the number of users who become paying customers due to an advertising campaign begins to fall, the workflow may update to display different information in messages or focus the campaign on the users who click on pURLs but have not converted yet.

At block 1606, the client may be alerted of the received action and the updated campaign workflow and a report is generated or updated based on the received action or information. In some embodiments, the reporting on the pURL includes which variable logic elements are associated with each pURL. In one embodiment, the report includes analytics of clicks, or lack thereof, of emails, SMS text messages, and pURLs by each user. In some embodiments, the report may include a tree diagram indicating which users visited microsites, and which microsites were visited from which pURLs. The report also indicates forms filled out and can be combined in a view with other pURL reports to display a unified view of multiple pURLs. In some embodiments, reports can display information relating to all campaign activity associated with a user from multiple campaigns.

In one example, the system may display how a user's interests have changed over a period of time, and how the system used the changes to trigger updated drip campaign workflows. In some embodiments, the report further includes a view that displays the status of a campaign in relation to all of the users in the campaign. The system may display how many opened messages and clicks were received in relation to how many were not received over a period of time. The user information displayed can be filtered to show a subgroup of the users associated with a campaign. For example, the system can receive a filter to only display users with the tag "VIP Donor" and only display information relating to corresponding users. The granularity level of the report can be updated to display each page or the campaign as a whole. The system may further comprise a trigger success indicator, displaying if updating the workflow using a received action helped, did not effect, or hurt the ratio of pURLs clicked to pURLs sent.

In some embodiments, the report includes conversion information relating to targeted users. The system may display a conversion rate, indicating how many of the pURL visitors became paying customers. The report may include data about purchase history relating to a user. The report may also include how many unique visitors access a pURL. Unique visitors can be counted as an IP address accessing a pURL. For example, if the system receives a pURL click followed by multiple microsite clicks from the same user, the system will indicate the actions as multiple clicks or opens, but one unique click. In one embodiment, the system may also receive input to display activity within a time period. In some embodiments, the report includes trigger information displaying which tags or content information seemed to be most popular in a campaign. In one embodiment, the report may include common information among users who have opened pURLs to indicate what a target audience for a campaign should be.

At block 1607, the system checks if the campaign is ongoing (e.g., if the campaign time is almost over, if the drip campaign workflow is over, etc.). If the campaign is ongoing, the system will continue monitoring the campaign until an action or information is received. In that case, the system will continue the process of updating the workflow and report until the campaign is over. Once the campaign is over, at block 1608, process 1600 ends.

Figure 17:
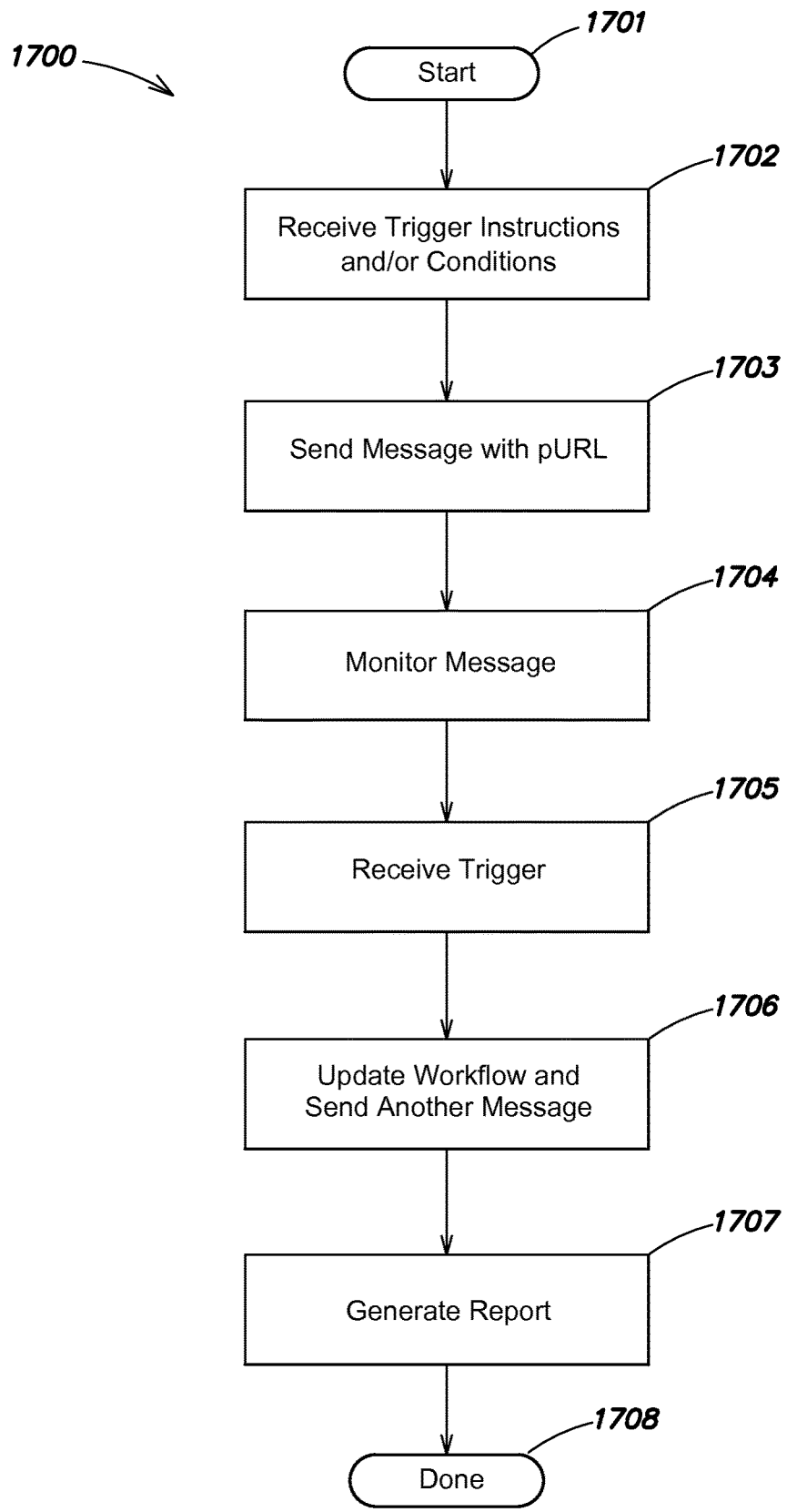
FIG. 17 is a flow diagram illustrating an example process for creating a triggered drip nurturing campaign.

FIG. 17 illustrates a process for creating a triggered drip nurturing campaign according to one embodiment of the present invention. At block 1701, process 1700 begins. At block 1702, the system displays a drip nurturing campaign UI and receives a pURL campaign name and a related microsite page that is to be associated with the drip nurturing campaign as well as trigger instructions and/or conditions. In some embodiments, a page is displayed that allows a drip campaign to be edited before a first message has been sent. For example, the campaign workflow can be set before the first message in a campaign is sent out. In other embodiments, the drip nurturing campaign may be edited after a first message has been sent. For example, a drip nurturing campaign may only be sent to consumers who open an email or fill out a form in a pURL.

Figure 18:
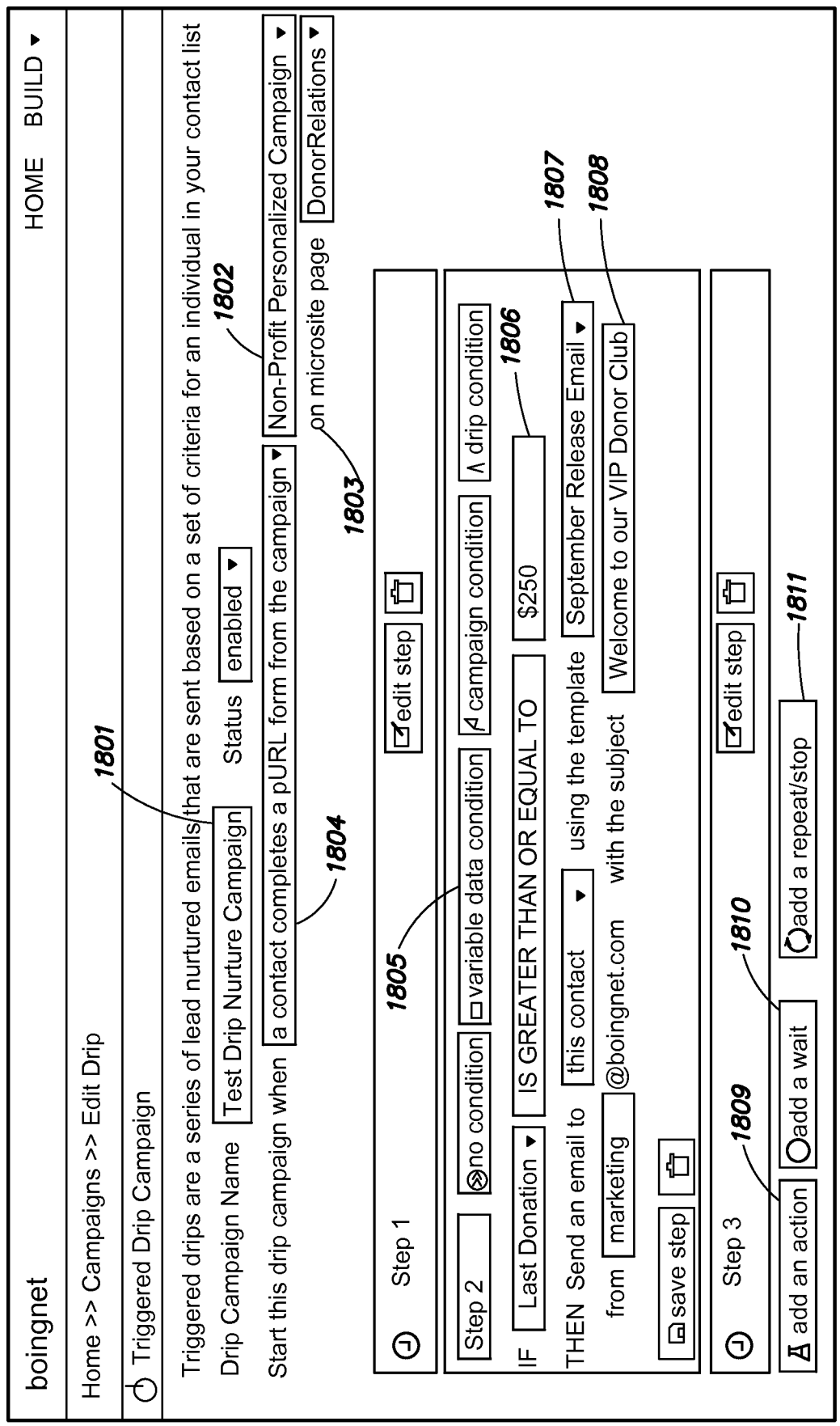
FIG. 18 is an example user interface of a drip nurturing campaign editing page.

In one example, the system receives trigger instructions and/or conditions that identify a trigger associated with a drip nurturing campaign. Additionally, in some embodiments, the system can receive variable logic (e.g., IF/THEN statements) describing one or more conditional statements that may be used to drive the campaign workflow for a specific user or group of users. In some embodiments, the IF/THEN statements can use data from a list or database of user information. An example of a user interface that creates a drip nurturing campaign is shown in FIG. 18. In this example user interface, the system receives a drip campaign name at input element 1801 that may be associated with the new drip nurturing campaign. The campaign that the drip campaign is associated with is chosen from a list of campaigns at control element 1802. The microsite that is associated with the campaign that a client wants to use the drip campaign on is chosen at control element 1803. In some embodiments, the system can associate multiple campaigns and/or microsites with one drip campaign.

The trigger is chosen at control element 1804. In some examples, a drip nurturing campaign can be triggered by a plurality of triggers. In some embodiments, triggers include when a consumer is added to a contact list, when a consumer opens an email from an email campaign, when a consumer clicks on an email from an email campaign, when a consumer opens a pURL from a pURL campaign, when a customer opens an SMS text message in an SMS campaign, when a customer opens a pURL from an email campaign or an SMS text message campaign, and when a consumer completes a form on a pURL from a pURL campaign. With triggers relating to pURLs, the campaigns can track and operate using any/all of the pages of a pURL microsite.

In some embodiments, multiple triggers can be associated with one step of a triggered drip campaign. For example, an email may be sent in response to a user either clicking a previous email or opening an SMS text message. A step of a drip nurturing campaign is one section of a drip campaign relating to one or more triggers. Multiple steps may be implemented one after another using various conditions and/or time periods. A time period may be a waiting period of a number of seconds, minutes, hours, days, months, or years. In this example, the first step is a waiting step that waits an amount of time from the beginning of a drip nurturing campaign before the next step. At control element 1805, a condition to be associated with a step is chosen. In this example, a variable data condition (e.g., an IF/THEN statement) is chosen. In other examples, campaign conditions (e.g., length of a campaign, type of message, etc.) or a drip condition (e.g., a statement based on previous actions, length of a drip campaign, how often messages should be sent, etc.) may be chosen.

In other examples, a step can be created without a condition. In some examples, a combination of conditions may be used for one step. In this example, an IF/THEN statement is created at input element rows 1806-1808. An IF statement targeting users with a last donation of at least $250 is shown, which sends an email to members of a "VIP Donor Club" who donated $250 or more. The drip campaign begins when a member, for example, completes a pURL donation form in a microsite page. If the donation in the form is at least $250, then the system may send a personalized email using the September Release Email template with user information. In some embodiments, each of the input elements on the drip editing page may incorporate user information. For example, the subject may be created as "Welcome % First Name %, to the September Donors Club" or "Invitation for the % Last Name % Family" to personalize the subject of a message.

In some examples, an input element may indicate who a message or drip nurturing campaign is sent to. The receivers of the campaign may include more than one user or more than one email of a user. In this example, in row 1807, the email is sent to "this contact," but in other examples the email may be sent to a group comprising various users such as, for example, a user's family, a group a user is a member of, and a group of people who pass the IF/THEN statement. At input element 1809, the system can receive input to add a step with another action. At input element 1810, the system can receive input to add a wait. At input element 1811, the system can receive input to add a repeat or stop.

Figure 19:
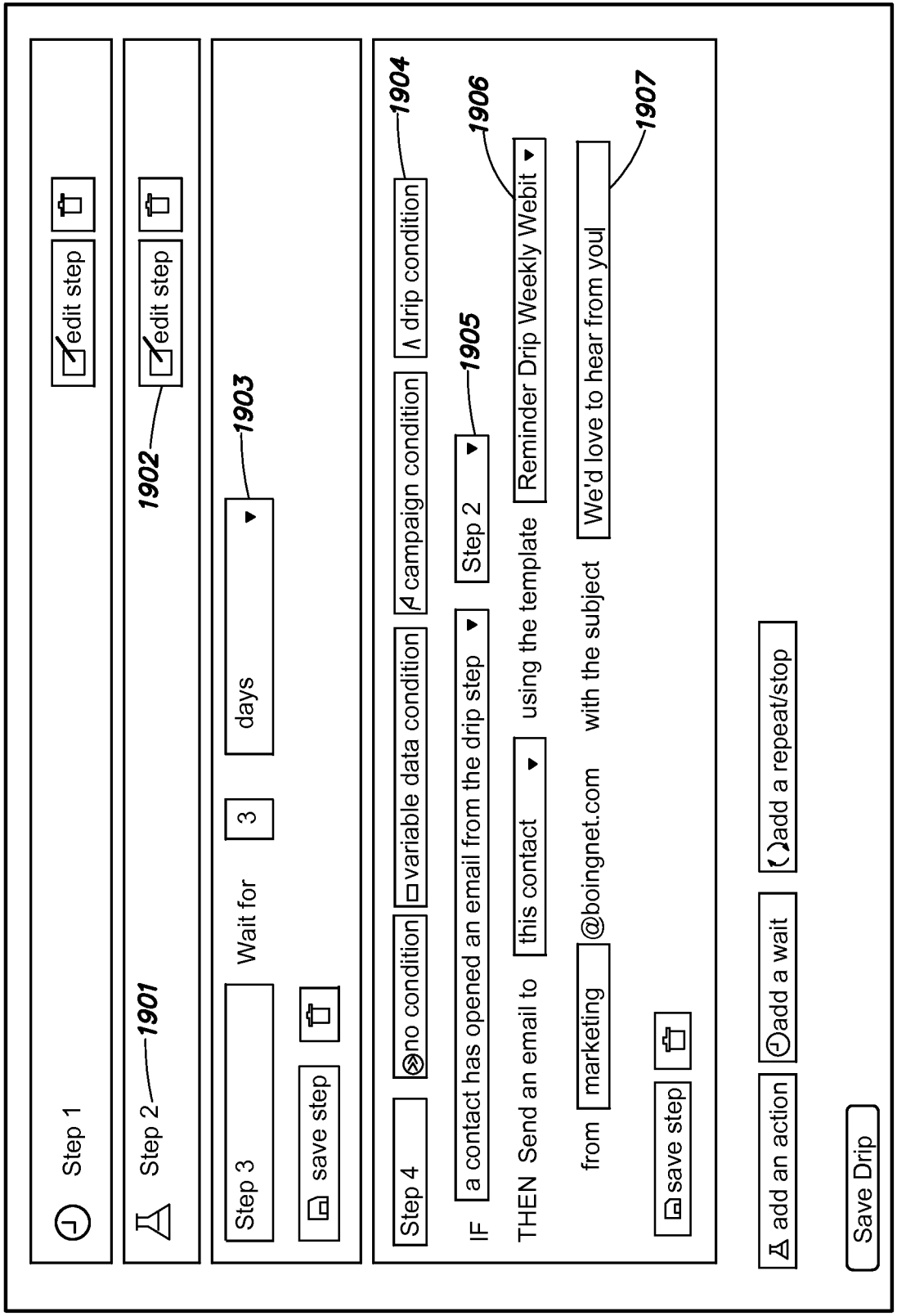
FIG. 19 is an example user interface of additional steps in a drip nurturing campaign editing page.

In some embodiments, multiple steps can be used in a campaign one after another. An example of additional steps created in a drip nurturing campaign is shown in FIG. 19. The step previously created to start the drip nurturing campaign after the initial wait is shown at 1901. In some embodiments, previously created steps can be edited at any time before or during the drip nurturing campaign. In some embodiments, the step can only be edited before the step is reached (i.e., if the drip nurturing campaign is to one specific user and the user is at step 3, step 2 may not be edited). In some embodiments, previously created steps can also be deleted. Step 3 is a time step that is able to be edited at row 1903. In some embodiments, the system can set the time step to be any amount of time between two steps of a campaign. In one embodiment, the time step relates to the action step immediately after the time step. For example, if a drip condition step includes a user clicking on an email, the timestep preceding the drip condition step may indicate how long the campaign has to receive the click before moving on to the next action step. In other embodiments, the time step is a wait between steps to monitor the previously sent message. In these embodiments, after the wait, the system may check to see if any actions have been taken in the allotted time and send a subsequent message following the received action.

An example drip condition is shown in rows 1904-1907. In this example, the drip condition relates to an action from a previously sent email. In some embodiments, a further step can be added that supersedes another step. For example, an email can be set to send pending an opening of an email and another email can be set to send pending a pURL click. In some examples, the email sent responsive to a pURL click (e.g., a pURL in an email) may be sent in place of the email sent responsive to the opening of the email with the pURL in it. If the system only receives an email opening but not a pURL click, the first email may be sent. In one example the steps have rankings and the condition with the highest ranking that has occurred by the time a wait is up is the one that is used. For example, if the system associates three drip conditions with one previous step and the user successfully does the action required by all three, the workflow may be configured to send the message responsive the highest ranked action (e.g., a message associated with filling out a form and donating more than $250 may be sent instead of a message associated with filling out the form and donating more than $50 and a message associated with opening an email). In the example shown in FIG. 19, at row 1905, a control element allows the system to receive conditional information based on a user action from step 2. Responsive the user action, the system may send another message (e.g., an email) to one or more users. In some embodiments, there is no limit to how many actions and waits can be added to a campaign. In one embodiment, there is no limit to how many steps can depend from one preceding step. In some examples more than one step can be active at the same time.

Referring back to FIG. 17, once all of the trigger instructions and/or conditions associated with the drip nurturing campaign are received, at block 1703, a message is sent out to at least one user. In some embodiments, the message sent out can be the first message in a campaign. The first message can include a pURL generated with user information. The first message can be, for example, a blast email that proves deliverability. In some embodiments, the message includes a pURL that is more general and not specifically targeted at specific users. In some embodiments, the first message may be sent using conditional logic to choose users from a list to target. For example, a first message in a campaign may only be sent to users who work in a specific location (e.g., users who live in Boston). In other embodiments, the first message may be sent in response to a user action (e.g., a filled out form).

In one implementation, the pURL generated may have a one-to-one mapping for a contact and a campaign. For example, a user named Alec Graziano may have a pURL generated as "AlecGraziano.MyJeep.com" to associate Alec with a JEEP (JEEP is a registered trademark of Chrysler Group, LLC.) campaign. The pURL "AlecGraziano.MyJeep.com" would then be related to that campaign. In some implementations, the pURL may have a plurality of microsites included that can be denoted by an addition to the main pURL (e.g., AlecGraziano.MyJeep.com/Introduction"). In this example, if Alec Graziano is in another campaign, another pURL such as, for example, AlecGraziano.MyDodge.com may be created to associated Alec Graziano with a DODGE (DODGE is a registered trademark of Chrysler Group, LLC.) campaign. In one example, Alec Graziano is associated with a single record with a single pURL, but may have multiple additions to the base pURL depending on associated campaigns. In some implementations, each of the drip pURLs (e.g., a pURL associated with a drip campaign sent in a drip email or SMS message) may have a targeted message or messages based on campaign activity.

In one example, the first message may be monitored (e.g., block 1704) until a trigger is received (e.g., block 1705). In some embodiments, the system can be configured to check for triggers after a period of time before sending the next wave of messages. For example, users may have five days to respond to an email. In some embodiments, an auto-responder may be used that automatically sends an email responsive to a user action such as, for example, a filling out of a form. In some embodiments, when the one or more triggers are received, the system may perform an action (e.g., send a message) corresponding to the trigger with a satisfied condition that is most inclusive of other satisfied trigger conditions, as mentioned above. In other embodiments, a message may be sent for each trigger with conditions that have been satisfied.

Figure 20:
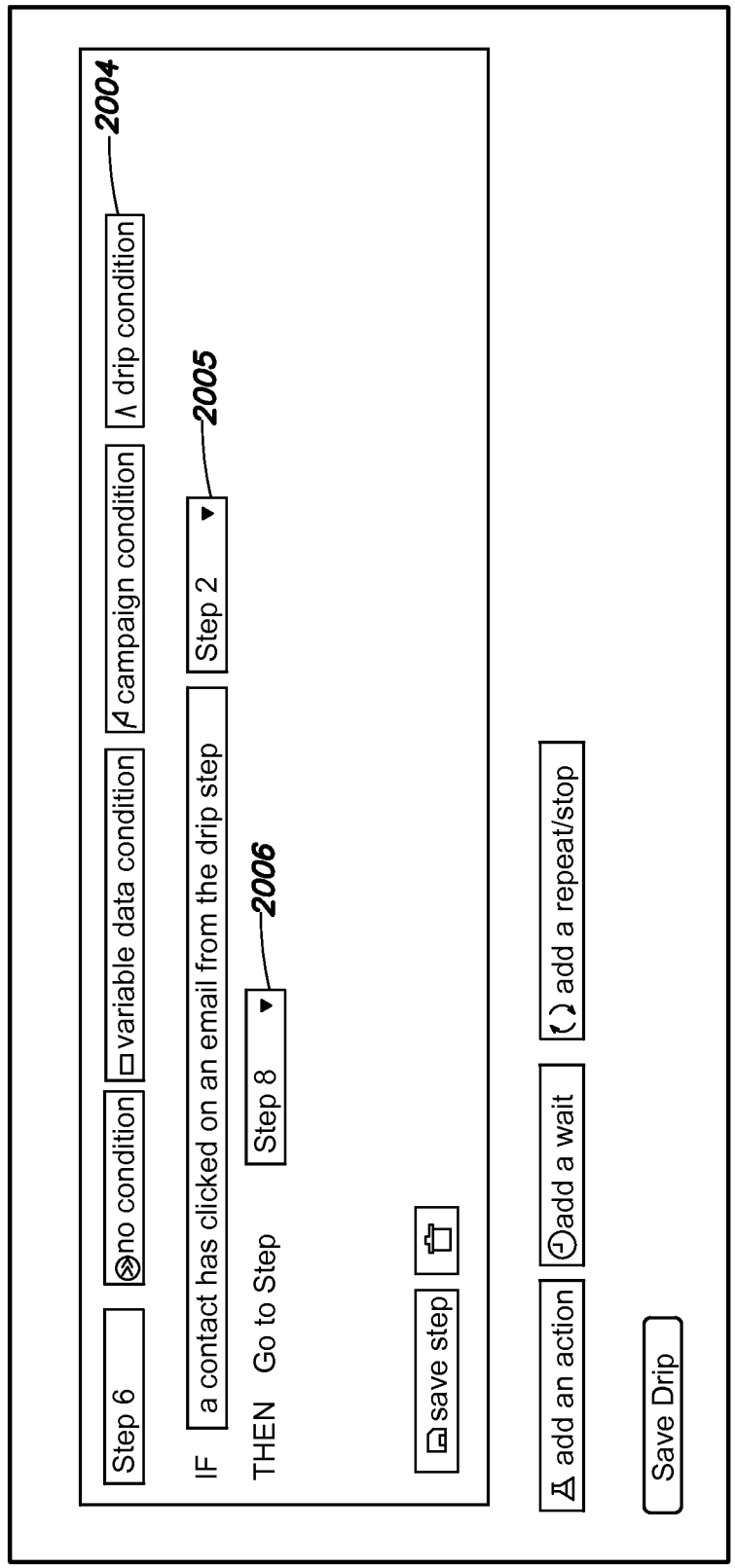
FIG. 20 is an example user interface of additional steps in a drip nurturing campaign editing page.

An example of a trigger step created in a drip nurturing campaign is shown in FIG. 20. Step 6 is an example drip condition step 2004 in which a trigger event causes the drip campaign to proceed to a trigger step 2006. In this example, the drip condition is triggered by a contact clicking an email from an earlier step (Step 2) in the drip campaign. Once the condition has been triggered, the drip campaign proceeds immediately to Step 8 without performing any intermediate steps. Such a condition may be useful where the drip campaign would otherwise call for a wait between steps, but the triggering condition supersedes that wait by causing the campaign to proceed without delay to the next interaction with the contact. Though in this example the trigger step 2006 follows the current step, it is possible for the trigger step 2006 to precede the current step. For example, the drip campaign may return to an earlier step in the drip campaign when a trigger event occurs, such as a user opening an email several days or weeks after receiving the message in the previous step.

Figure 21:
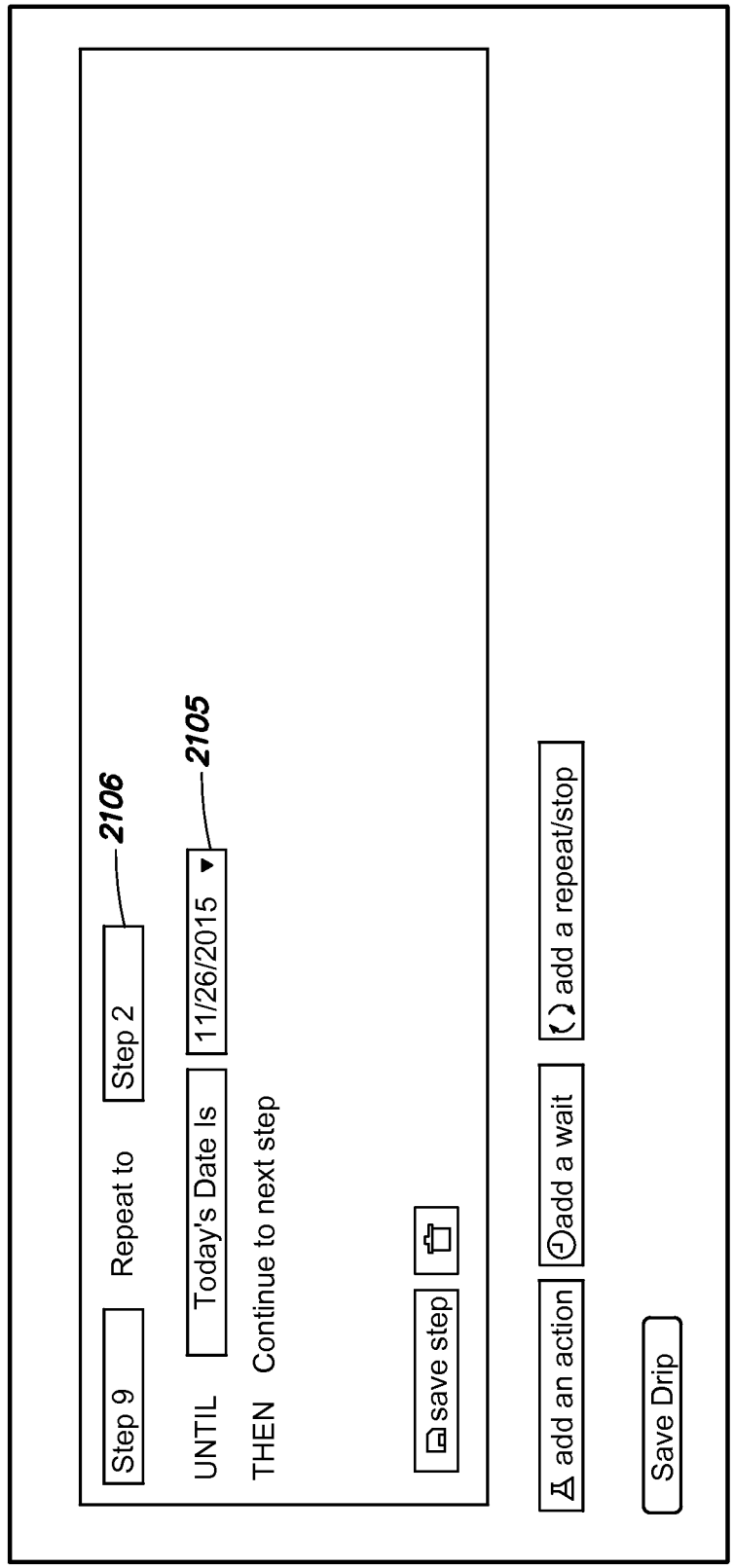
FIG. 21 is an example user interface of additional steps in a drip nurturing campaign editing page.

An example of a repeat step created in a drip nurturing campaign is shown in FIG. 21. Upon reaching a repeat step, a drip nurturing campaign may return to an earlier repeat step 2106, and continue to do so upon reaching the repeat step unless and until a terminating condition 2105 is met. Step 9 is an example repeat step in which, upon reaching Step 9, the drip nurturing campaign returns to Step 2 in the campaign unless the current date is Nov. 26, 2015, in which case the drip campaign proceeds to the next step. In some embodiments, the terminating condition may be a number of times that the repeat is performed. For example, the terminating condition 2105 may indicate that the first two times the repeat step is reached, the campaign should repeat to step 2, but for any subsequent occurrences of the repeat step, the campaign should not perform the repeat but instead proceed to the next step.

At block 1706, another message may be sent due to a trigger that is related to at least one previous step. For example, a message may be sent at step 5 due to a user clicking an email sent and tracked during step 2. The workflow is also updated when a user action is tracked. In some embodiments, the system may gray out previous steps that have passed (e.g., the time associated with the step has passed) to indicate that they cannot be edited anymore. In some embodiments, in the drip nurturing campaign editing page, currently active steps may be colored green or have an indication to show that the steps are active.

In some examples, the second message sent may include a personalized pURL drip within a message (e.g., a direct mail message, an email message, or an SMS text message). A drip is an advertisement created with data from a lead campaign. A pURL drip may be defined by a base pURL associated with a user plus additional wording to indicate the campaign and microsite. For example, a campaign called JohnSmith.Boingnet.com can be the lead generation campaign pURL and the pURL drip created after receiving a trigger from the first pURL may be a pURL drip called JohnSmith.Boingnet.com/LaptopFallSale, or JohnSmith-.LaptopFallSale.Boingnet.com. In these examples, the pURL drip is sent in, for example, a personalized email drip (e.g., an email sent out in response to a trigger with a pURL drip inside it). In other examples the pURL drip may be sent in a personalized SMS text message drip or a direct mail message drip in response to the system receiving a trigger. In one implementations the pURL may be a link within an image, a QR code, or a shortened pURL.

In some examples, once the workflow is updated, at block 1707, a report is generated that includes information for each of the pURLs or the campaign as a whole. In some embodiments, the report is simply updated (e.g., if the report has already been generated before). In one embodiment, the report includes which users opened or clicked on which emails, SMS text messages, and pURLs, as well as which forms were filled out. The report may also include a list of triggers and conditions, and display which conditions were and were not met.

Processes 1600 and 1700 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A computer-implemented method for managing an advertising campaign, the method comprising:
   generating, in a memory, a campaign data structure comprising:
      a first set of personalized codes associated with at least one first user-specific advertisement, wherein each personalized code in the first set of personalized codes is different than the other personalized codes in the first set of personalized codes;
      a template;
      a storage structure storing a plurality of advertising credits for deductions in response to sending respective ones of the plurality of communications; and
      a schedule for sending a plurality of communications, the schedule comprising:
         a first time for sending a first set of communications to a first set of users, wherein each communication of the first set of communications is generated based on the template and comprises a personalized code from the first set of personalized codes;
         a set of one or more conditions for detecting elapsing of a period of time since the first time, and instructions to send a second set of communications to a second set of users in response to the period of time elapsing, wherein the second set of users is determined based on whether one or more of the users of the first set of users used their associated personalized code;
   at the first time in the schedule, sending the first set of communications to the first set of users, wherein the first set of communications includes the first set of personalized codes associated with the at least one first user-specific advertisement, each personalized code of the first set of personalized codes comprises a one-to-one mapping for one of the first set of users and the advertising campaign;
   triggering a first deduction from the storage structure storing the plurality of advertising credits responsive to the act of sending the first set of communications;
   tracking the first set of personalized codes associated with of the first set of users to determine information indicative of whether each personalized code of the first set of personalized codes is used by an associated user of the first set of users;
   determining that the period of time since the first time elapsed;
   determining the second set of users based on the information indicative of whether each personalized code of the first set of personalized codes is used by an associated user of the first set of users, such that the second set of users is a subset of the first set of users, wherein the second set of users are respectively associated with a second set of personalized codes that is a subset of the first set of personalized codes, and wherein the subset of the first set of personalized codes are respectively used by associated users of the first set of users;
   determining whether at least one of the first set of users used a respective associated personalized code;
   when it is determined that the at least one of the first set of users used the respective associated personalized code before the period of time since the first time has elapsed, sending the second set of communications to the second set of users, wherein each communication of the second set of communications includes a respective personalized code of the second set of personalized codes associated with the second set of users, and wherein the respective personalized code is associated with at least one second user-specific advertisement that is different from the at least one first user-specific advertisement;
   when it is determined that the at least one of the first set of users used the respective associated personalized code after the period of time since the first time elapsed, sending a third communication to the at least one of the first set of users;
   determining whether a personalized code of the first set of personalized codes is used by a user other than the one of the first set of users associated with the personalized code;
   when it is determined that the personalized code is used by the user other than the one of the first set of users associated with the personalized code, monitoring the personalized code; and
   triggering a second deduction from the storage structure storing the plurality of credits responsive to sending the second set of communications.

2. The method according to claim 1, wherein sending the first set of communications comprises sending the first set of communications via at least one of an email, an SMS text message, and a direct mail message.

3. The method according to claim 1, further comprising generating the first set of personalized codes based on user information targeting the first set of users.

4. The method according to claim 3, wherein the user information comprises one or more of an email address, a phone number, demographic information, and behavioral information.

5. The method according to claim 1, wherein the information indicative of whether each personalized code of the first set of personalized codes is used by an associated user of the first set of users includes detection of one or more of a user entering their associated personalized code in a website, an opening of an email, an opening of a microsite, a filling out of a form, and an opening of an SMS text message.

6. The method according to claim 1, further comprising receiving the plurality of advertising credits.

7. The method according to claim 1, further comprising:
generating a message associated with the second set of communications;
tracking the message to determine whether the second set of users access the message; and
updating the advertising campaign responsive to determine that the second set of users access the second message.

8. The method according to claim 1, further comprising generating the first set of personalized codes by generating a personalized URL (pURL), a shortened pURL for the pURL, or both.

9. A computer system for managing an advertising campaign, the computer system comprising:
at least one processor operatively connected to a memory, the at least one processor configured to:
generate, in the memory, a campaign data structure comprising:
a first set of personalized codes associated with at least one first user-specific advertisement, wherein each personalized code in the first set of personalized codes is different than the other personalized codes in the first set of personalized codes;
a template;
a storage structure storing a plurality of advertising credits for deductions in response to sending respective ones of the plurality of communications; and
a schedule for sending a plurality of communications, the schedule comprising:
a first time for sending a first set of communications to a first set of users, wherein each communication of the first set of communications is generated based on the template and comprises a personalized code from the first set of personalized codes;
a set of one or more conditions for detecting elapsing of a period of time since the first time, and instructions to send a second set of communications to a second set of users in response to the period of time elapsing, wherein the second set of users is determined based on whether one or more of the users of the first set of users used their associated personalized code;
at the first time in the schedule, send the first set of communications to the first set of users, wherein the first set of communications includes the first set of personalized codes associated with the at least one first user-specific advertisement, each personalized code of the first set of personalized codes comprises a one-to-one mapping for one of the first set of users and the advertising campaign;
trigger a first deduction from the storage structure storing the plurality of advertising credits responsive to the act of sending the first set of communications;
track the first set of personalized codes associated with the first set of users to determine information indicative of whether each personalized code of the first set of personalized codes is used by an associated user of the first set of users;
determine that the period of time since the first time elapsed;
determine the second set of users based on the information indicative of whether each personalized code of the first set of personalized codes is used by an associated user of the first set of users, such that the second set of users is a subset of the first set of users, wherein the second set of users are respectively associated with a second set of personalized codes that is a subset of the first set of personalized codes, and wherein the subset of the first set of personalized codes are respectively used by associated users of the first set of users;
determining whether at least one of the first set of users used a respective associated personalized code;
when it is determined that the at least one of the first set of users used the respective associated personalized code before the period of time since the first time has elapsed, sending the second set of communications to the second set of users, wherein each communication of the second set of communications includes a respective personalized code of the second set of personalized codes associated with the second set of users, and wherein the respective personalized code is associated with at least one second user-specific advertisement that is different from the at least one first user-specific advertisement;
when it is determined that the at least one of the first set of users used the respective associated personalized code after the period of time since the first time elapsed, sending a third communication to the at least one of the first set of users;
determining whether a personalized code of the first set of personalized codes is used by a user other than the one of the first set of users associated with the personalized code;
when it is determined that the personalized code is used by the user other than the one of the first set of users associated with the personalized code, monitoring the personalized code; and
trigger a second deduction from the storage structure storing the plurality of credits responsive to sending the second set of communications.

10. The system according to claim 9, wherein the at least one processor is further configured to send the first set of communications comprises at least in part by sending the first set of communications via at least one of an email, an SMS text message, and a direct mail message.

11. The system according to claim 9, wherein the information indicative of whether each personalized code of the first set of personalized codes is used by an associated user of the first set of users includes detection of a user action.

12. The system according to claim 11, wherein the user action comprises one or more of a user entering their associated personalized code into a website, an opening of an email, an opening of a microsite, a filling out of a form, and an opening of an SMS text message.

13. The system according to claim 9, wherein the at least one processor is further configured to:

receive one or more content elements, the one or more content elements including the template and one or more user-provided content elements; and bind the template and the one or more user-provided content elements with the first set of personalized codes at least in part by generating a landing page that includes a display of a portion of content including the received one or more user-provided content elements in accordance with the template.

14. The system according to claim 9, wherein the at least one processor is further configured to generate the first set of personalized codes by generating a personalized URL (pURL), a shortened pURL for the pURL, or both.

15. The system according to claim 9, wherein the at least one processor is further configured to receive the plurality of advertising credits.

16. The system according to claim 9, wherein the at least one processor is further configured to:
generate a message associated with the second set of communications;
track the message to determine whether the second set of users access the message and
update the advertising campaign responsive to determine that the second set of users access the message.

17. The system according to claim 9, wherein the at least one processor is further configured to generate a report indicating the updated advertising campaign.

18. The system according to claim 17, wherein the generated report includes a number of times the each personalized code from the first set of personalized codes was used.

19. A non-transitory computer readable medium having stored thereon sequences of instructions for managing a campaign, including instructions that will cause at least one processor to:
generate, in the memory, a campaign data structure comprising:
a first set of personalized codes associated with at least one first user-specific advertisement, wherein each personalized code in the first set of personalized codes is different than the other personalized codes in the first set of personalized codes;
a template;
a storage structure storing a plurality of advertising credits for deductions in response to sending respective ones of the plurality of communications; and
a schedule for sending a plurality of communications, the schedule comprising:
a first time for sending a first set of communications to a first set of users, wherein each communication of the first set of communications is generated based on the template and comprises a personalized code from the first set of personalized codes;
a set of one or more conditions for detecting elapsing of a period of time since the first time, and instructions to send a second set of communications to a second set of users in response to the period of time elapsing, wherein the second set of users is determined based on whether one or more of the users of the first set of users used their associated personalized code;
at the first time in the schedule, send the first set of communications to the first set of users, wherein the first set of communications includes the first set of personalized codes associated with the at least one first user-specific advertisement, each personalized code of the first set of personalized codes comprises a one-to-one mapping for one of the first set of users and the advertising campaign;
trigger a first deduction from the storage structure storing the plurality of advertising credits responsive to the act of sending the first set of communications;
track the first set of personalized codes associated with the first set of users to determine information indicative of whether each personalized code of the first set of personalized codes is used by an associated user of the first set of users;
determine that the period of time since the first time elapsed;
determine the second set of users based on the information indicative of whether each personalized code of the first set of personalized codes is used by an associated user of the first set of users, such that the second set of users is a subset of the first set of users, wherein the second set of users are respectively associated with a second set of personalized codes that is a subset of the first set of personalized codes, and wherein the subset of the first set of personalized codes are respectively used by associated users of the first set of users;
determining whether at least one of the first set of users used a respective associated personalized code;
when it is determined that the at least one of the first set of users used the respective associated personalized code before the period of time since the first time has elapsed, sending the second set of communications to the second set of users, wherein each communication of the second set of communications includes a respective personalized of the second set of personalized codes associated with the second set of users, and wherein the respective personalized code is associated with at least one second user-specific advertisement that is different from the at least one first user-specific advertisement;
when it is determined that the at least one of the first set of users used the respective associated personalized code after the period of time since the first time elapsed, sending a third communication to the at least one of the first set of users;
determining whether a personalized code of the first set of personalized codes is used by a user other than the one of the first set of users associated with the personalized code;
when it is determined that the personalized code is used by the user other than the one of the first set of users associated with the personalized code, monitoring the personalized code; and
trigger a second deduction from the storage structure storing the plurality of credits responsive to sending the second set of communications.

20. The non-transitory computer readable medium according to claim 19, wherein sending the first set of communications comprises sending the first set of communications via at least one of an email, an SMS text message, and a direct mail message.

* * * * *